(12) United States Patent
Vora et al.

(10) Patent No.: US 11,798,289 B2
(45) Date of Patent: Oct. 24, 2023

(54) STREAMING OBJECT DETECTION AND SEGMENTATION WITH POLAR PILLARS

(71) Applicant: Motional AD LLC, Boston, MA (US)

(72) Inventors: Sourabh Vora, Marina Del Rey, CA (US); Qi Chen, Baltimore, MD (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/710,833

(22) Filed: Mar. 31, 2022

(65) Prior Publication Data

US 2022/0383640 A1 Dec. 1, 2022

Related U.S. Application Data

(60) Provisional application No. 63/194,694, filed on May 28, 2021.

(51) Int. Cl.
*G06V 20/58* (2022.01)
*G06T 7/10* (2017.01)
*G06V 10/40* (2022.01)
*G06V 10/82* (2022.01)

(52) U.S. Cl.
CPC ............... *G06V 20/58* (2022.01); *G06T 7/10* (2017.01); *G06V 10/40* (2022.01); *G06V 10/82* (2022.01); *G06T 2207/10028* (2013.01); *G06T 2207/20084* (2013.01); *G06T 2207/30252* (2013.01)

(58) Field of Classification Search
CPC ........ G06V 20/58; G06V 10/40; G06V 10/82; G06T 7/10; G06T 2207/10028; G06T 2207/20084; G06T 2207/30252

USPC ......................................................... 382/103
See application file for complete search history.

(56) References Cited

U.S. PATENT DOCUMENTS

| | | | |
|---|---|---|---|
| 2005/0004448 A1* | 1/2005 | Gurr | G01R 33/54 324/309 |
| 2018/0203124 A1 | 7/2018 | Izzat et al. | |
| 2018/0349746 A1 | 12/2018 | Vallespi-Gonzalez | |
| 2019/0065824 A1 | 2/2019 | Gaudet et al. | |

(Continued)

OTHER PUBLICATIONS

[No Author Listed], "SAE International Standard J3016: Taxonomy and Definitions for Terms Related to Driving Automation Systems for On-Road Motor Vehicles," SAE International, dated Sep. 2016, 30 pages.

(Continued)

*Primary Examiner* — Siamak Harandi
(74) *Attorney, Agent, or Firm* — Fish & Richardson P.C.

(57) ABSTRACT

Among other things, techniques for detecting objects in the environment surrounding a vehicle are described. A computer system is configured to receive a set of measurements from a sensor of a vehicle. The set of measurements includes a plurality of data points that represent a plurality of objects in a 3D space surrounding the vehicle. The system divides the 3D space into a plurality of pillars. The system then assigns each data point of the plurality of data points to a pillar in the plurality of pillars. The system generates a pseudo-image based on the plurality of pillars. The pseudo-image includes, for each pillar of the plurality of pillars, a corresponding feature representation of data points assigned to the pillar. The system detects the plurality of objects based on an analysis of the pseudo-image. The system then operates the vehicle based upon the detecting of the objects.

20 Claims, 21 Drawing Sheets

(56) References Cited

U.S. PATENT DOCUMENTS

| | | |
|---|---|---|
| 2019/0311499 A1 | 10/2019 | Mammou et al. |
| 2020/0093464 A1* | 3/2020 | Martins .................. A61B 8/12 |
| 2020/0111358 A1 | 4/2020 | Parchami et al. |
| 2020/0150235 A1 | 5/2020 | Beijbom et al. |
| 2020/0311569 A1 | 10/2020 | Ghosh |
| 2021/0150752 A1* | 5/2021 | Ayvaci .................. G06N 3/08 |
| 2021/0158043 A1 | 5/2021 | Hou et al. |
| 2021/0312227 A1 | 10/2021 | Moradiannejad et al. |
| 2022/0032452 A1 | 2/2022 | Casas et al. |
| 2022/0104463 A1 | 4/2022 | Spears et al. |
| 2022/0371606 A1 | 11/2022 | Vora et al. |

OTHER PUBLICATIONS

Liu et al., "SSD: Single Shot Multibox Detector," Presented at The 14th European Conference on Computer Vision—ECCV 2016, Amsterdam, The Netherlands, Oct. 8-16, 2016; Lecture Notes in Computer Science, 9905:21-37, available at https://arxiv.org/pdf/1512.02325.pdf.

* cited by examiner

STREAMING OBJECT DETECTION AND SEGMENTATION WITH POLAR PILLARS

CROSS REFERENCE TO RELATED APPLICATIONS

This application claims priority to U.S. Provisional Patent Application No. 63/194,694, filed May 28, 2021, the entire contents of which are incorporated herein by reference.

FIELD OF THE INVENTION

This description relates to a computer system for detecting one or more objects in the environment surrounding an autonomous vehicle using deep learning techniques.

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects in the surroundings.

SUMMARY

The subject matter described in this specification is directed to a computer system and techniques for detecting objects in an environment surrounding an autonomous vehicle. Generally, the computer system is configured to receive input from one or more sensors of the vehicle, detect one or more objects in the environment surrounding the vehicle based on the received input, and operate the vehicle based upon the detection of the objects.

In particular, the computer system receives a set of measurements such as a point cloud from a sensor of a vehicle (for example, LiDAR or RADAR). The set of measurements includes a plurality of data points that represent a plurality of objects in a three-dimensional (3D) space surrounding the vehicle. Each data point of the plurality of data points is a set of 3D spatial coordinates. The system divides the 3D space into a plurality of pillars, in which each pillar of the plurality of pillars extends vertically (in the z-direction) from a respective portion of the 2D ground plane of the 3D space. In some embodiments, the pillars are polar pillars. The system then assigns each data point of the plurality of data points to a pillar in the plurality of pillars. The system generates a pseudo-image based on the plurality of pillars. The pseudo-image includes, for each pillar of the plurality of pillars, a corresponding feature representation of data points assigned to the pillar. The system detects the plurality of objects in the 3D space surrounding the sensor based on an analysis of the pseudo-image. The system then operates the vehicle based upon the detecting of the plurality of objects in the 3D space surrounding the vehicle.

These and other aspects, features, and implementations can be expressed as methods, apparatuses, systems, components, program products, means or steps for performing a function, and in other ways.

These and other aspects, features, and implementations will become apparent from the following descriptions, including the claims.

DETAILED DESCRIPTION

Figure 1:
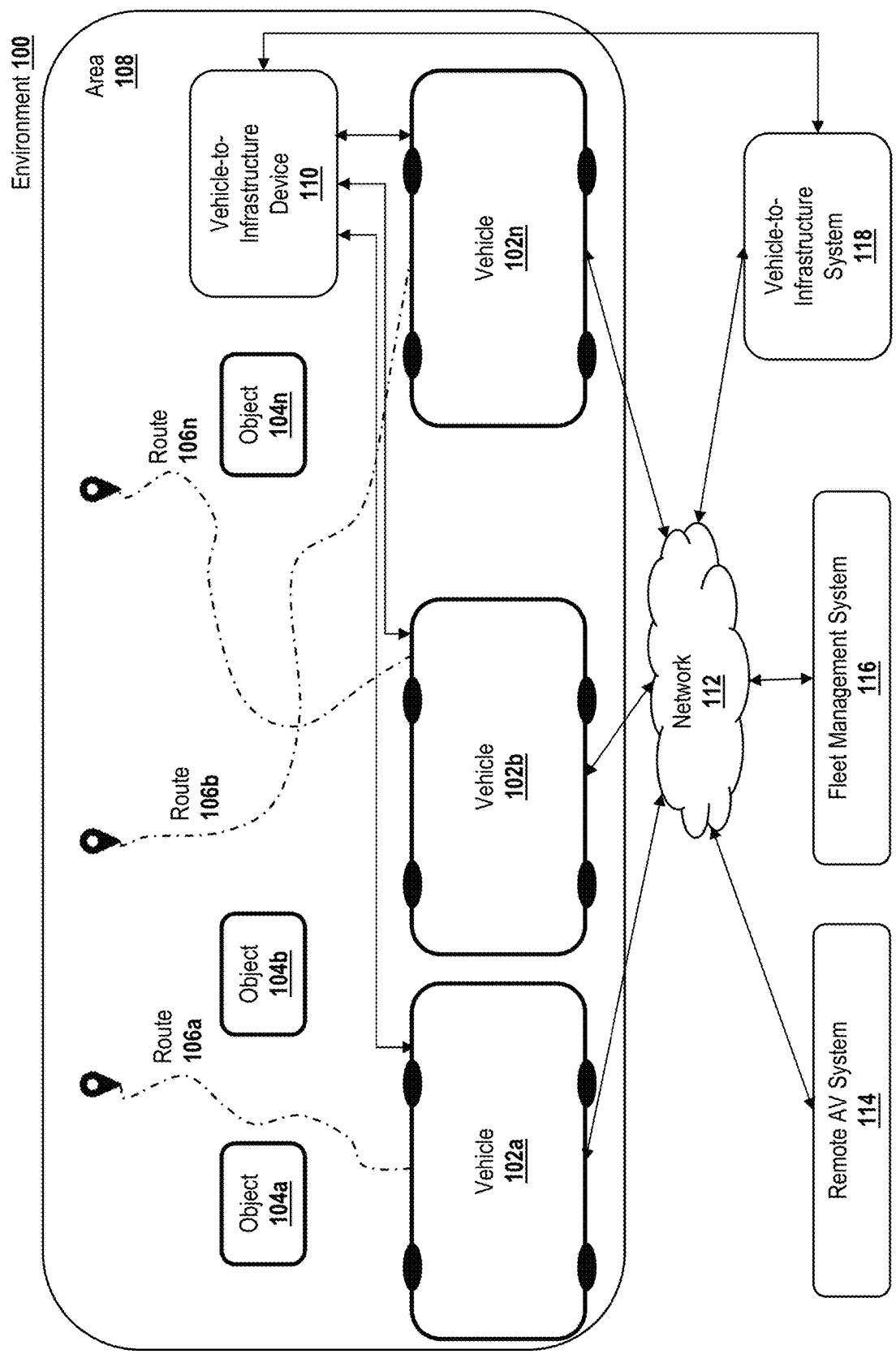
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description.

General Overview

Autonomous vehicles driving in complex environments (e.g., an urban environment) pose a great technological challenge. In order for autonomous vehicles to navigate these environments, the vehicles detect various types of objects such as vehicles, pedestrians, and bikes in real-time using sensors such as LiDAR, radar, camera, or ultrasonic sensors. One approach for performing object detection on image inputs is deep learning. However, the sparsity of sensor data (e.g., LiDAR point clouds) makes existing image-based deep learning techniques computationally inefficient. The disclosed embodiments include a system and techniques for efficiently and quickly detecting 3D objects based on sensor data.

In some embodiments, the system and techniques described herein implement machine learning (e.g., a neural network) that can handle the sparsity of a three-dimensional (3D) point cloud by generating a representation of the 3D point cloud that uses virtual pillars, which are vertical columns that extend from a two-dimensional (2D) grid on a 2D ground plane. Using virtual pillars as data structures for organizing the data points of the 3D point cloud, the system can generate a sparse pseudo-image that represents features of the 3D point cloud. In some embodiments, the pseudo-image is a feature map. The system can further process the pseudo-image using 2D convolutions, followed by an object detection neural network to detect objects in the environment. While traditional approaches require using 3D convolutions, the system and techniques described herein use 2D convolutions, thereby reducing computational complexity and accelerating training and inference. Further, the system can process pillars in parallel, leading to a vast improvement in speed compared to existing methods. In addition, by learning features directly from the point cloud using an encoder instead of fixed encoding, the disclosed techniques can leverage the full information represented by the 3D point cloud, thus allowing for higher performance (e.g., higher accuracy) and faster inference compared to existing object detection methods.

In some embodiments, the system and techniques described herein implement machine learning (e.g., a neural network) that can handle the sparsity of a 3D point cloud by generating a representation of the 3D point cloud that uses polar pillars, which are vertical columns that extend from a polar grid on a 2D ground plane. In some cases, the use of Cartesian coordinate systems represent the wedges of LiDAR data as rectangular regions, wasting memory and compute resources. The present techniques increase the spatial context by using multi-scale padding from the preceding sector. The polar convolutional architecture uses feature undistortion and range stratified convolutions to improve object detection. Experimental results on a modified nuScenes dataset shows significant improvements over other traditional streaming based methods. The present techniques achieve comparable results to existing non-streaming methods but with lower latencies. In this manner, LiDARs are represented as an inherently streaming data source and the end-to-end latency of LiDAR perception models is reduced significantly by operating on point cloud wedges rather than the full point cloud.

Hardware Overview

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device)

includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
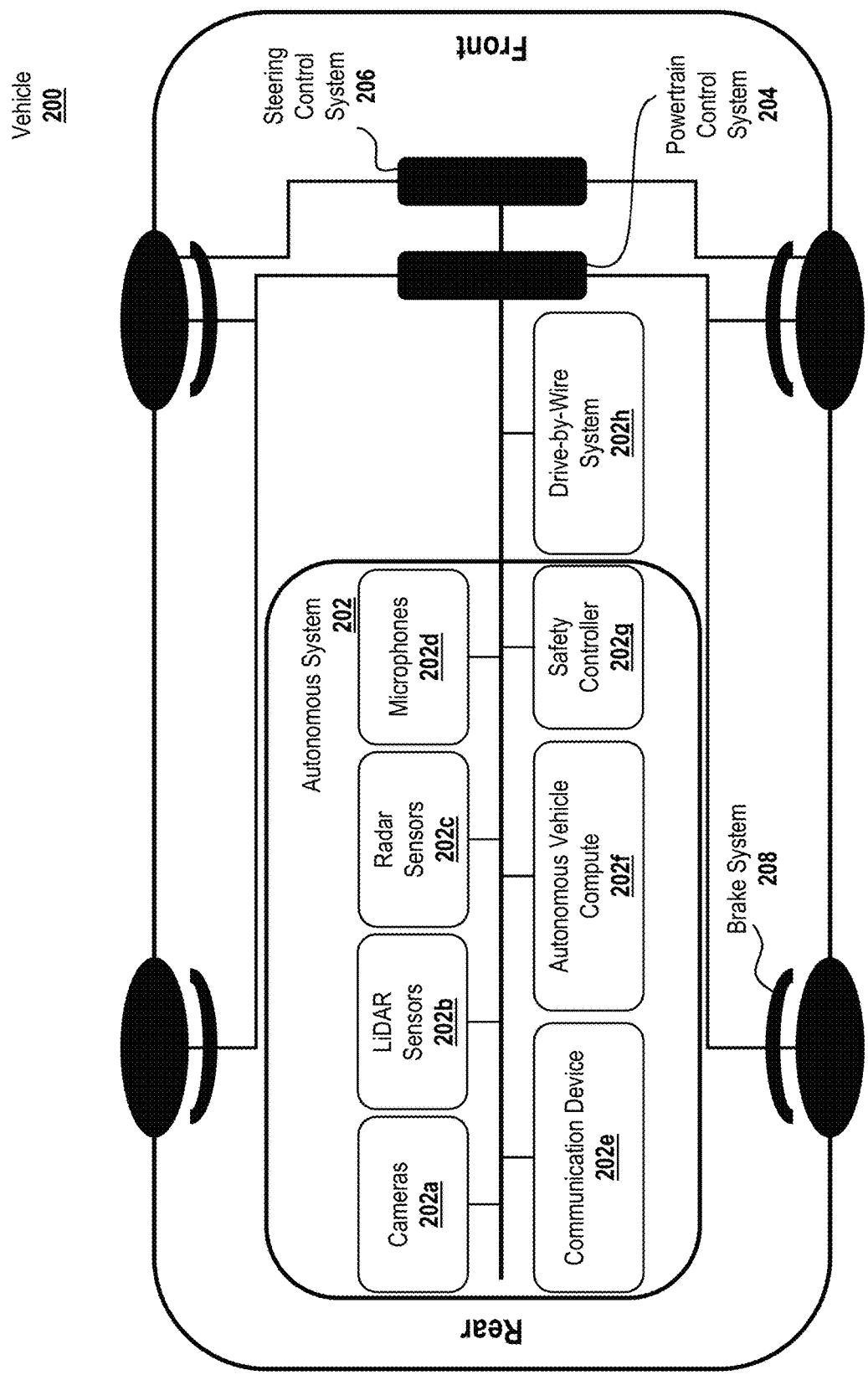
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
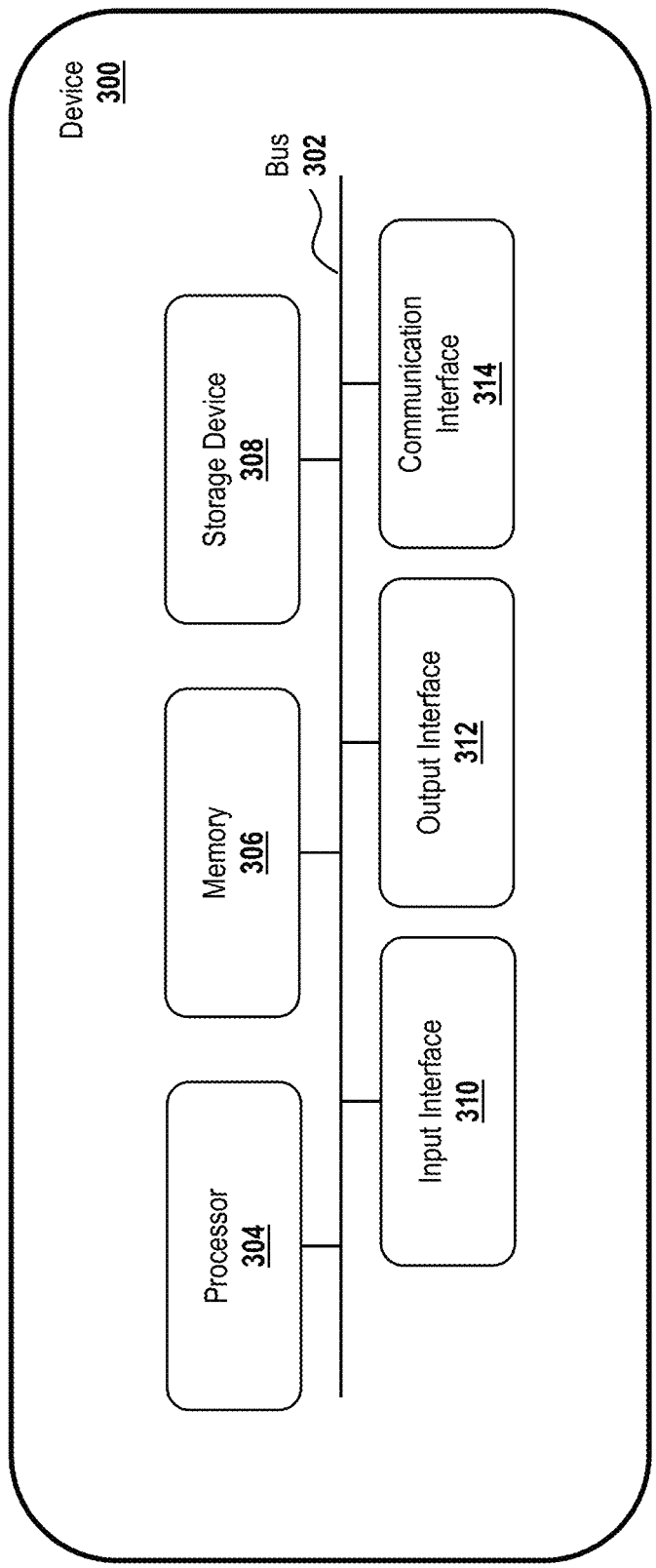
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202*b*, radar sensors 202*c*, microphones 202*d*, communication device 202*e*, autonomous vehicle computer 202*f,* and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f.*

DBW system 202*h* includes at least one device configured to be in communication with communication device 202*e* and/or autonomous vehicle compute 202*f.* In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102) and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
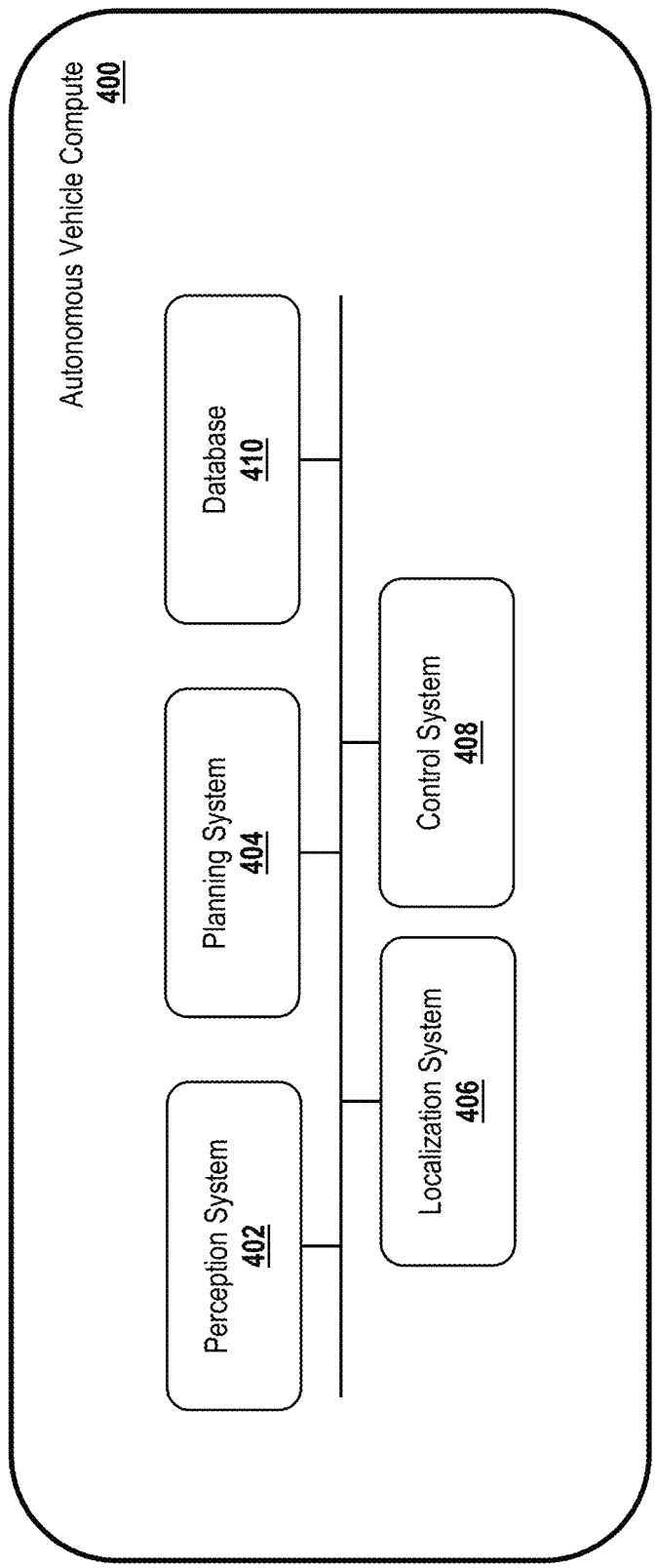
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to 2D and/or a 3D map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
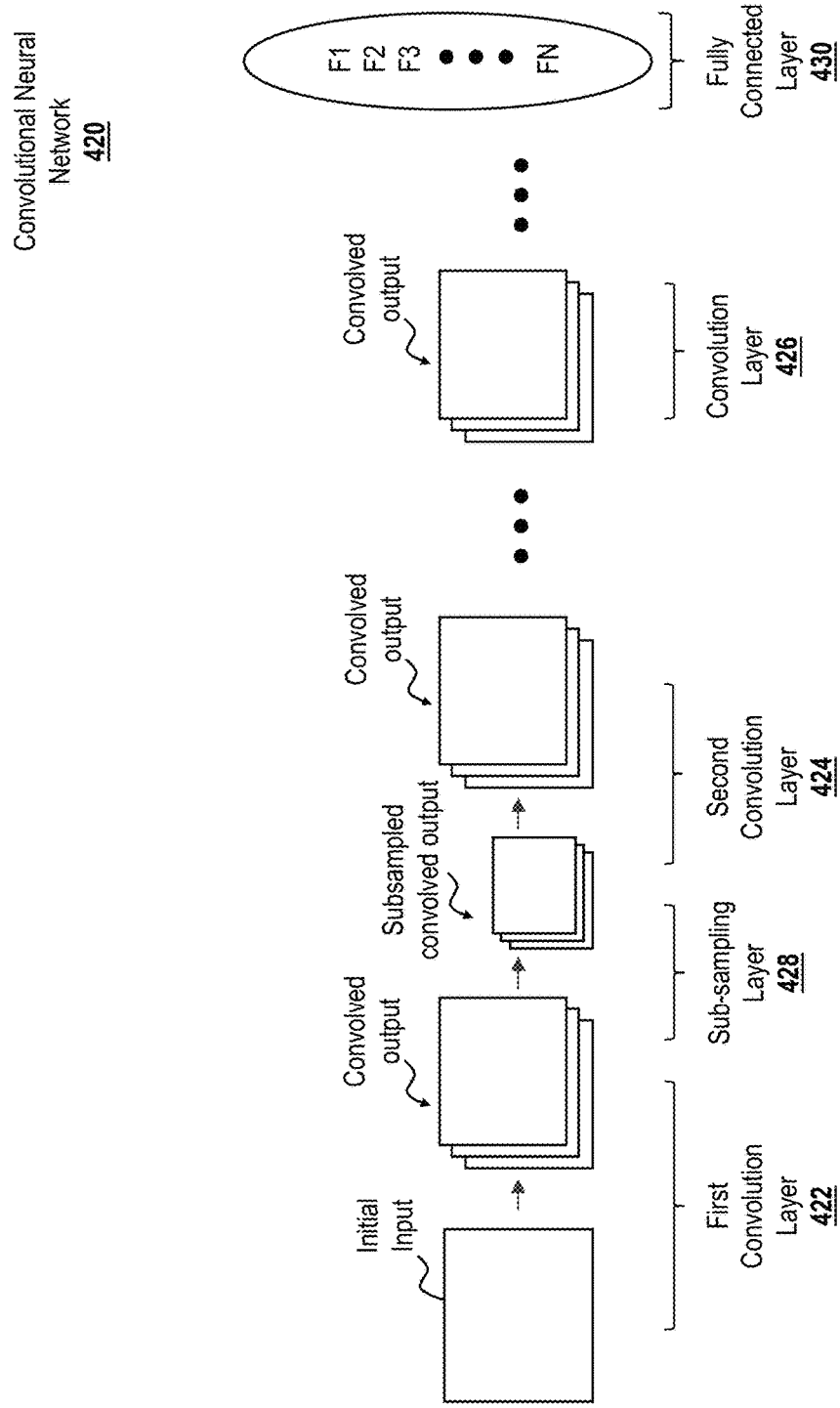
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
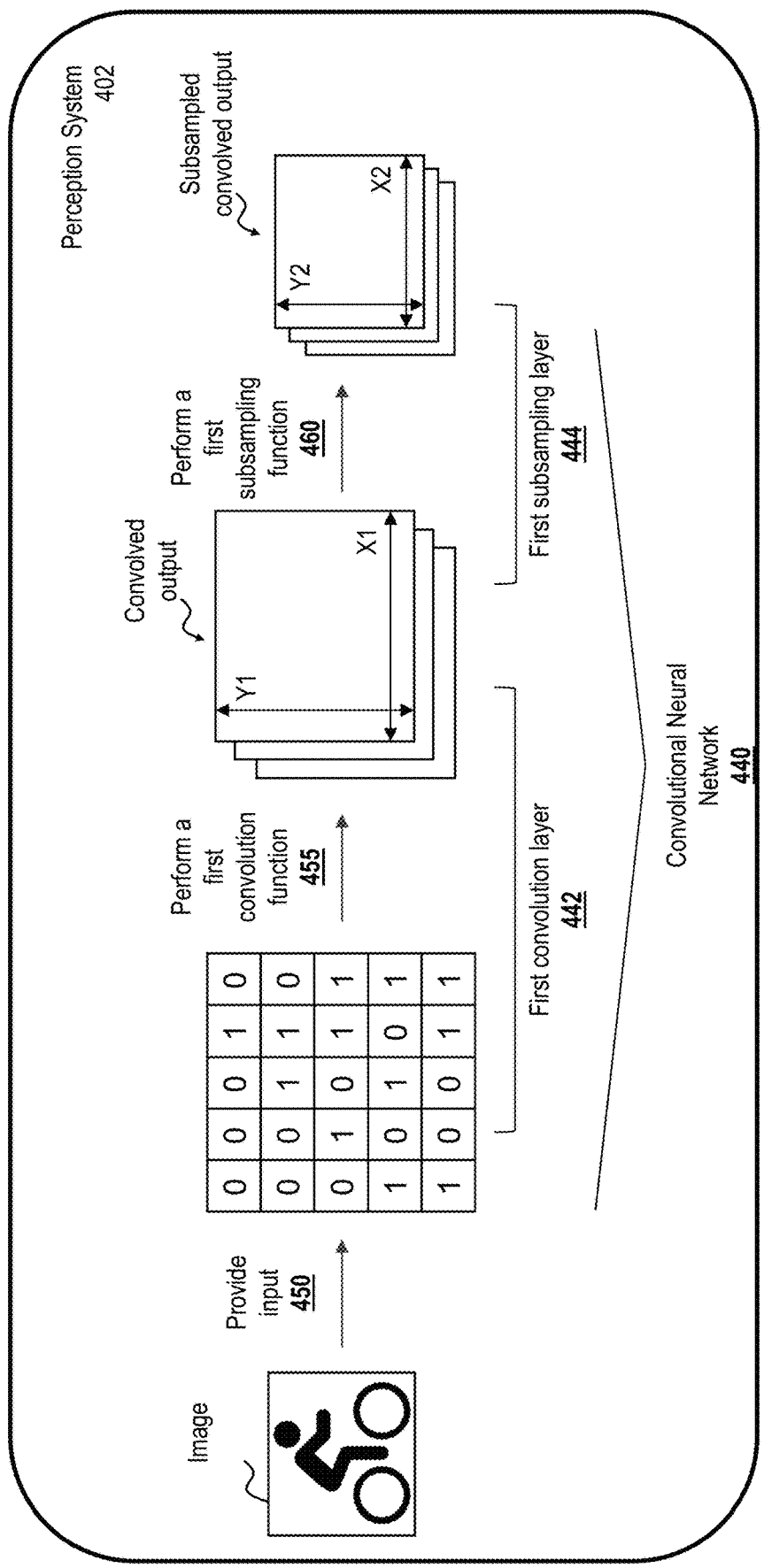
FIG. 4C and 4D are a diagram illustrating example operation of a convolutional neural network.
Figure 4D:
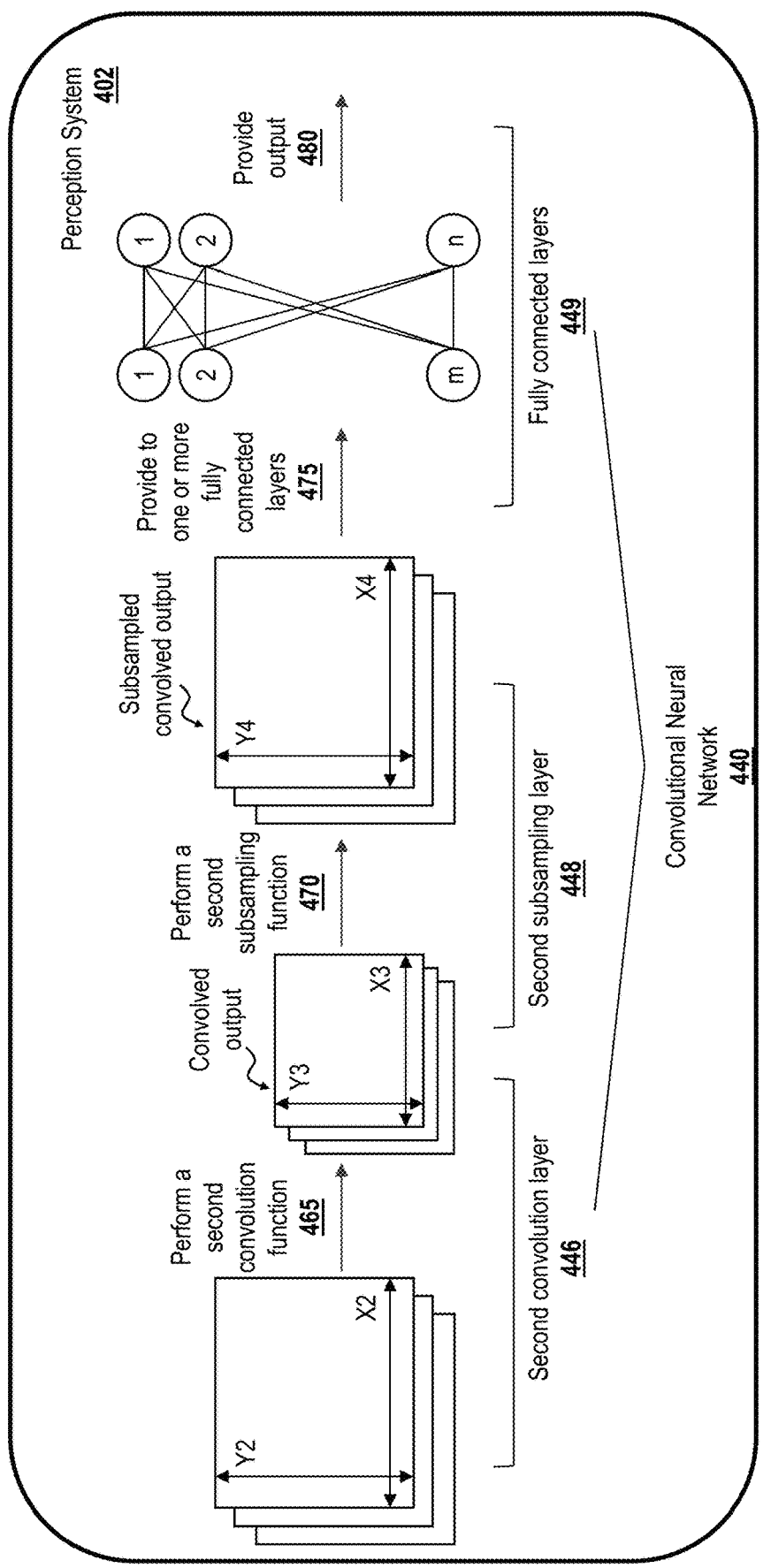

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a sub sampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5:
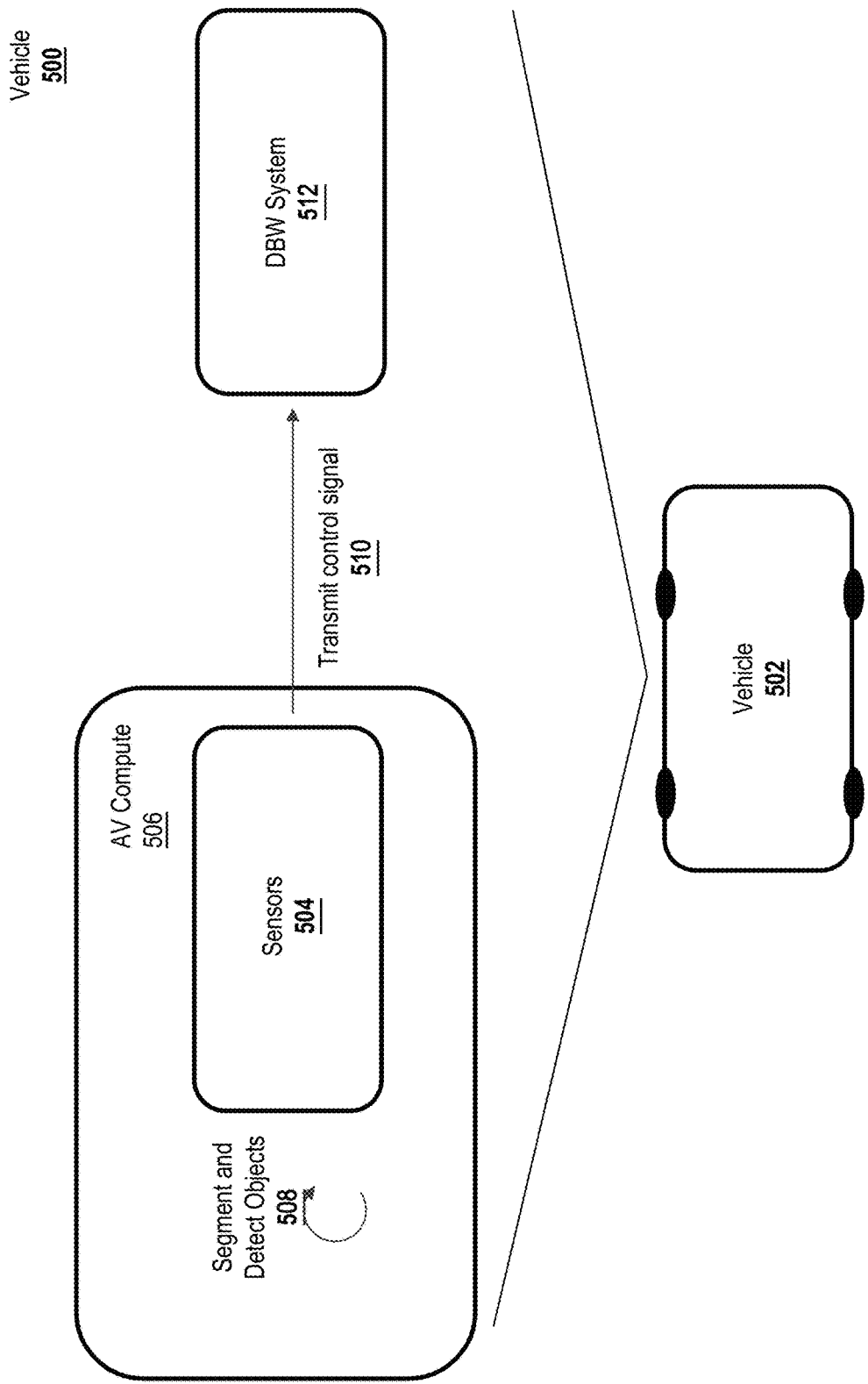
FIG. 5 is a diagram of an implementation of a process for deep learning for object detection using pillars.

Referring now to FIG. 5, illustrated are diagrams of an implementation 500 of a process for deep learning for object detection using pillars. In some embodiments, implementation 500 includes sensors 504 in an AV compute 506. In some embodiments, a network (e.g., network 1000) segments and detects objects 508 as described below. The objects may be objects 104a-104n described with respect to FIG. 1. In some embodiments, perception system 402 receives data associated with at least one physical object (e.g., data that is used by perception system 402 to detect the at least one physical object) in an environment and classifies the at least one physical object. A planning system (e.g., planning system 404) generates or updates at least one trajectory based on the data generated by the perception system. A control signal 510 is based on the sensor data, and is used to operate the vehicle as commanded by a DBW system 512.

Figure 6:
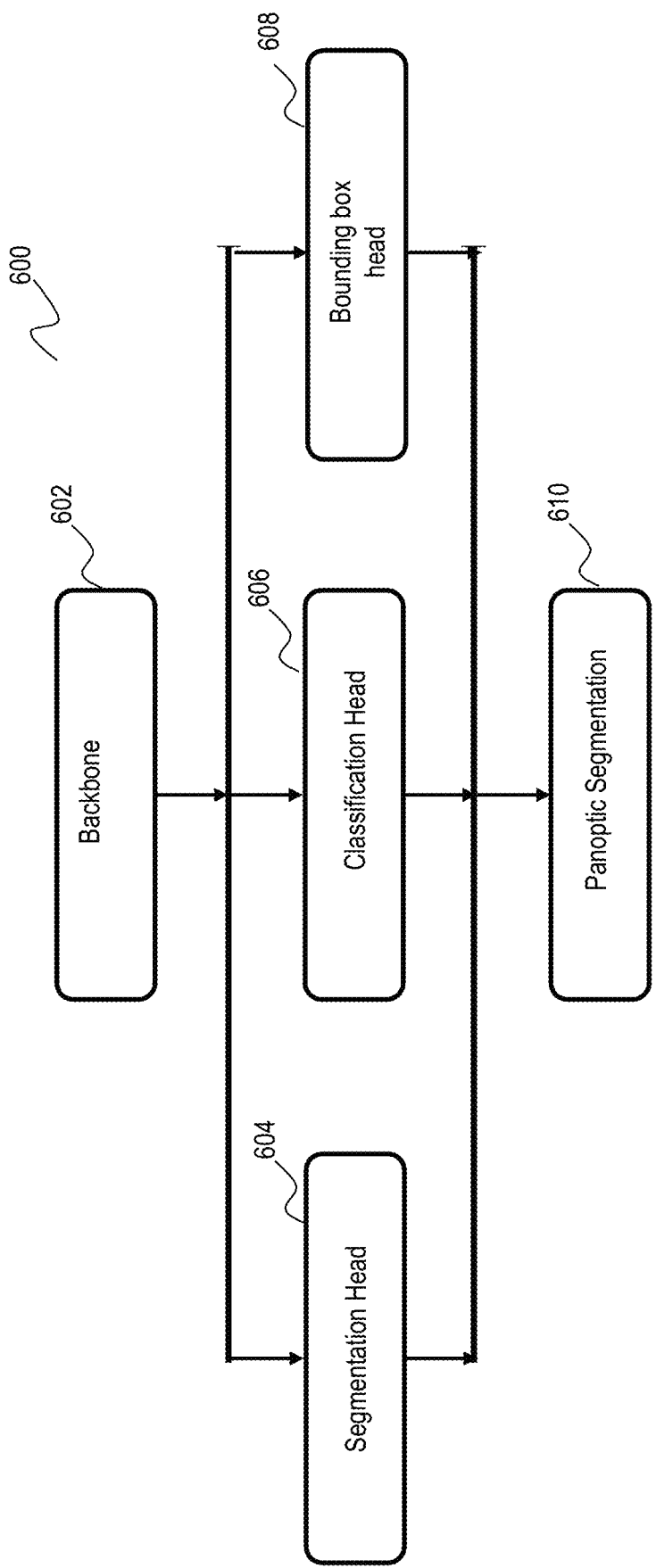
FIG. 6 is a flowchart of a process for deep learning for object detection using pillars.

Referring now to FIG. 6, illustrated is a flowchart of a process 600 for object detection using pillars. In some embodiments, one or more of the steps described with respect to process 600 are performed (e.g., completely, partially, and/or the like) by autonomous system 202 (FIG. 2). Additionally, or alternatively, in some embodiments one or more steps described with respect to process 600 are performed (e.g., completely, partially, and/or the like) by another device or group of devices separate from or including autonomous system.

With continued reference to FIG. 6, at block 602 a backbone of the network upsamples a feature map. In some embodiments, the backbone is CNN 420 or CNN 440 as described with respect to FIGS. 4A-4D. Referring again to FIG. 6, at block 604, a segmentation head of the network determines a class associated with each pixel. Simultaneously, at block 606 a classification head generates object classifications based on the feature map, and at block 608 a bounding box head generates bounding boxes for each object based on the feature map. At block 610, panoptic fusion is performed. In panoptic fusion, different instances of the same class are identified. For example, if there are two cars in a scene, the two cars are identified as distinct instances of a car, such as car 0 and car 1. In some embodiments, the detected and segmented objects as output by the segmentation head 604, classification head 606, and bounding box head 608 are generated by or provided to the perception system 402, planning system 404, localization system 406, and/or control system 408 (FIG. 4). In this manner, the present techniques enable object detection using pillars.

Computer System for Object Detection

Figure 7:
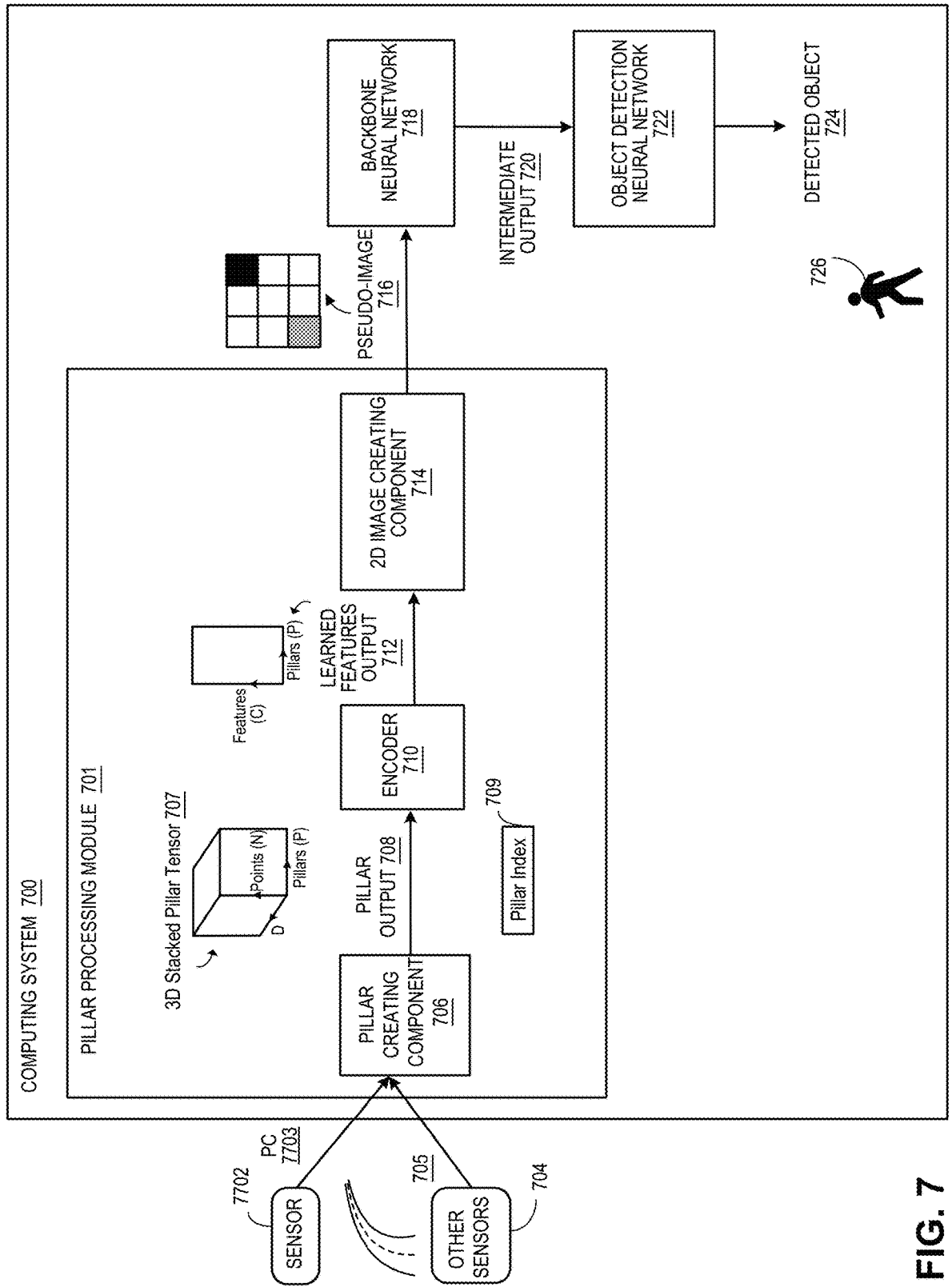
FIG. 7 shows an example architecture of a computing system for object detection using pillars.

FIG. 7 shows an example architecture of a computing system 700 for object detection. In this example, the computer system 700 can be located on an autonomous vehicle and be part of a larger computing system that algorithmically generates control actions based on real-time sensor data and prior information, allowing the vehicle to execute its autonomous driving capabilities. The computer system 700 can be implemented in a similar manner as the computing devices 146 located on the AV 100 described with respect to FIG. 1.

Generally, a computer system 700 is configured to receive an input from one or more sensors of the vehicle, detect one or more objects in the environment surrounding the vehicle based on the received input, and operate the vehicle based upon the detection of the objects. To detect the objects, the computing system 700 implements a pillar processing module 701, a backbone neural network 718, and an object detection neural network 722. In some embodiments, the pillar processing module 701 is the pillar feature module 1010 described with respect to FIG. 10. The backbone neural network 718 corresponds to the backbone 1012 of FIG. 10.

The pillar processing module 701 includes a pillar creating component 706, an encoder 710, and a 2D image creating component 714. The pillar creating component 706 is configured to receive as input a set of measurements, for example, a point cloud 703, from a sensor 702 of the vehicle. In some embodiments, the sensor 702 is a LiDAR, for example, the LiDAR as described above. In some embodiments, the sensor 702 is a RADAR, for example, the RADAR described above. In an embodiment, the pillar creating component 706 is configured to receive a merged point cloud that is generated by combining the point clouds from multiple LiDARS.

Figure 12:
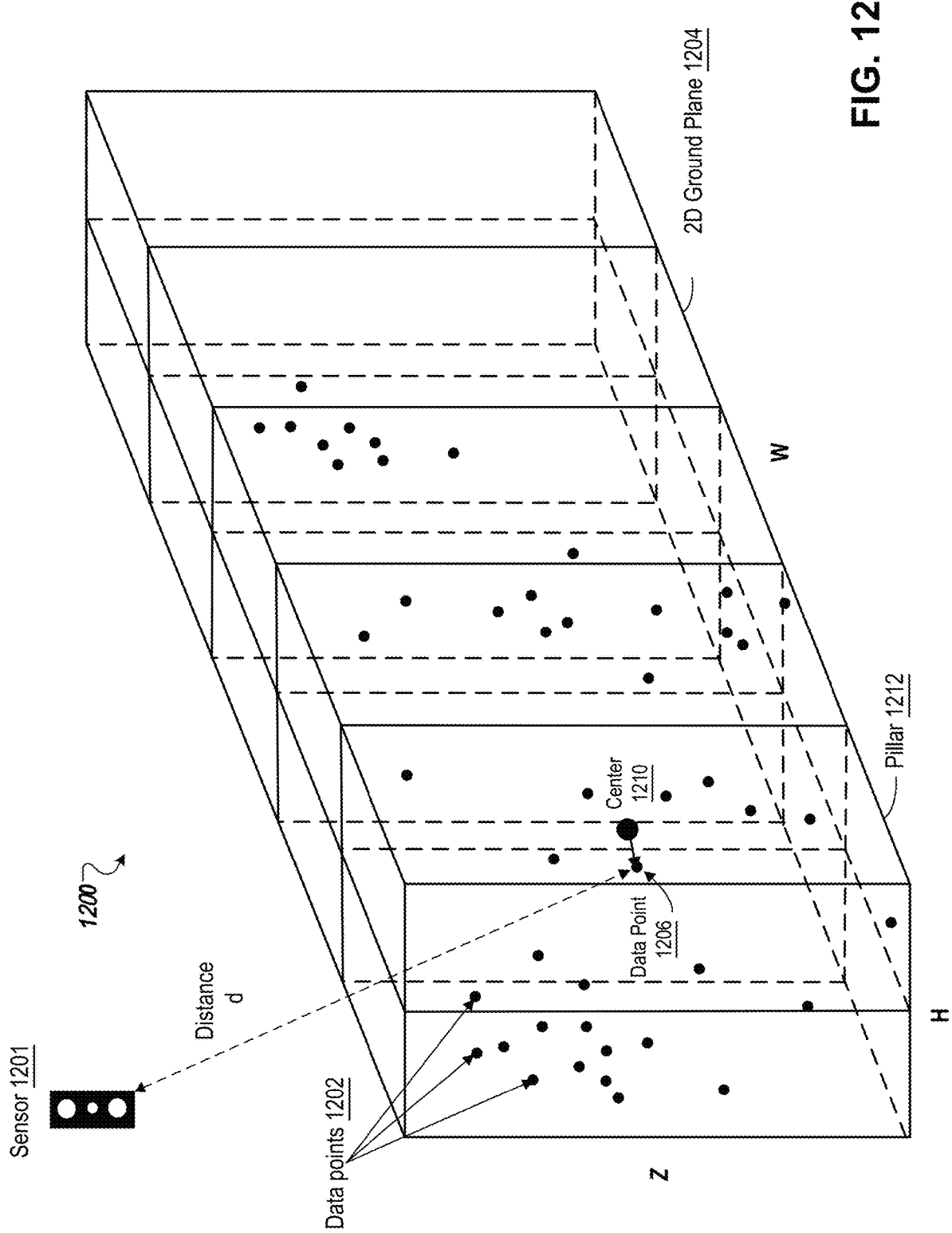
FIG. 12 illustrates an example point cloud and pillars.

The point cloud 703 includes a plurality of data points that represent a plurality of objects in 3D space surrounding the vehicle. For example, the plurality of data points represents a plurality of objects including one or more of a vehicle (e.g., a car, a bike or a truck), a pedestrian, an animal, a static object (for example, vegetation, buildings, etc.), or infrastructure (e.g., traffic lights). Each data point of the plurality of data points is a set of 3D spatial coordinates, for example, (x, y, z) coordinates. An example point cloud with a plurality of data points is illustrated in FIG. 12.

The pillar creating component 706 is configured to divide the 3D space into a plurality of pillars. Each pillar of the plurality of pillar is a slice of the 3D space and each pillar extends from a respective portion of the 2D ground plane (e.g., the x-y plane) of the 3D space. In an embodiment, the 3D spatial coordinates are defined relative to the LiDAR coordinate frame. The x-y plane runs parallel to the ground, while z is perpendicular to the ground. In an embodiment, a pillar extends indefinitely up and down (z direction) corresponding to area below the ground and towards the sky in the environment. For example, in case of use of ground penetrating radars or other sensors that scan subsurface features the pillars extend downwards below the surface. Similarly, if the sensors include LiDARs with large fields of view or other sensors that scan a large area above the ground. In an embodiment, a pillar has a fixed minimum height and a fixed maximum height that corresponds to the observed environment including the ground and the tallest objects of interest.

In some embodiments, the pillar creating component 706 divides the 2D ground plane into a 2D grid that has grid cells having the same size (e.g., square grid cells having sides of equal length), and therefore the pillars extending vertically (e.g., in the z-direction) in the 3D space from these 2D grid cells have the same volume. In an embodiment, the size of the grid cells is variable and can be determined based on the computational requirements. A coarser grid will be less accurate and require less computational resources. Similarly, a finer grid will lead to increased accuracy at the cost of increased computational resources. In an embodiment, the grid cells have sides of unequal length.

In some embodiments, the pillar creating component 706 divides the 2D ground plane into a 2D grid with different grid cell sizes. For example, the component 706 detects in the point cloud 703 a density of objects using additional input 705 from other sensors 704 (e.g., a camera). The component 706 can generate a 2D grid with different grid cell sizes so that there are more pillars located in a region of high object density, less pillars located in a region of low object density, and no pillars in a region of no objects.

In some embodiments, the pillar creating component 706 divides the 2D ground plane into a 2D polar grid with different grid cell sizes. For example, the component 706 detects in the point cloud 703 a density of objects using additional input 705 from other sensors 704 (e.g., a camera, LiDAR, radar, or ultrasonic sensor). The component 706 can generate a 2D polar grid in a polar coordinate system so that there are pillars with shapes that correspond to the LiDAR coordinate frame (e.g., the natural shape of point cloud data). Put another way, most cells in the 2D polar grid contain data and are not empty due to a lack of correspondence between a shape of the point cloud data and a shape of the grid. In some embodiments, a 2D polar grid includes more pillars located in a region of high object density, less pillars located in a region of low object density, and no pillars in a region of no objects. In some embodiments, a 2D polar grid includes a plurality of substantially wedge shaped cells. In examples, the point cloud 703 is divided into a number (n) of sectors according to an azimuth. For example, for a 2D polar grid divided into 32 sectors, each sector corresponds to an azimuth of 360/32°.

Next, the pillar creating component 706 assigns each data point of the plurality of data points to a pillar in the plurality of pillars. For example, each data point of the plurality of data points is assigned to a respective pillar based on the 2D coordinates of the data point. That is, if the 2D coordinates of a data point are within a particular portion of the 2D ground plane which a particular pillar extends from, the data point is assigned to that particular pillar.

After the data points are assigned to the pillars, the pillar creating component 706 determines whether a first count of a plurality of non-empty pillars (pillars that have at least one data point) exceeds a threshold value P.

If the first count of the plurality of non-empty pillars exceeds P, the pillar creating component 706 selects P non-empty pillars from the plurality of non-empty pillars. For example, the pillar creating component 706 randomly subsamples P non-empty pillars from the plurality of non-empty pillars.

If the first count of non-empty pillars is less than the first threshold value P, the pillar creating component 706 generates a second subset of empty pillars, such that a sum of the first count and a second count of the second subset of pillars is equal to P. The pillar creating component 706 then selects P non-empty pillars from the plurality of non-empty pillars and the second subset of pillars.

For each non-empty pillar of the P non-empty pillars, the pillar creating component 706 is configured to maintain a threshold number of data points in each non-empty pillar. To do this, the pillar creating component 706 first determines, for each non-empty pillar of the P non-empty pillars, whether a third count of data points assigned to the non-empty pillar exceeds a second threshold value N.

For each non-empty pillar of the P non-empty pillars, if the third count of the data points assigned to the non-empty pillar exceeds the second threshold value N, the pillar creating component 706 selects N data points to be maintained in the non-empty pillar. For example, the pillar creating component 706 randomly subsamples N data points from the data points assigned to the non-empty pillar. In an embodiment, N is usually determined to be high enough such that there is a near statistical certainty (>99%) that one or more points from each object are captured in the point pillars. In an embodiment, different algorithms are used to further reduce the risk of missing an object during the sampling of data points. If the third count of the data points in the non-empty pillar is less than N, the pillar creating component 706 assigns the non-empty pillar a plurality of zero coordinate data points, such that the sum of a fourth count of the plurality of zero coordinates and the third count equals N.

In some embodiments, the first threshold value P and the second threshold value N are predetermined values. In an embodiment, P and N are predetermined based on the distribution of data points such that a fraction of the data points is removed. In some embodiments, the first threshold value P and the second threshold value N are adaptive values. In particular, based on a density of the objects in the 3D space, the pillar creating component 706 can adjust P and/or N such that there are more pillars and/or more data points allowed in each pillar in the region of high object density, less pillars and/or less data points in each pillar in the region of low object density, and no pillars in the region of no objects.

For each non-empty pillar of the plurality of non-empty pillars, the pillar creating component 706 generates a plurality of modified data points based upon the plurality of data points in each non-empty pillar. In particular, for each non-empty pillar, the pillar creating component 706 generates, for each data point in the non-empty pillar, a respective modified data point based on a relative distance between the data point and a center of the non-empty pillar. The center of the pillar is chosen such that the coordinate systems of the modified data points and the neural network used in subsequent processing is aligned. In an embodiment, the pillar creating component 706 generates, for each data point in the non-empty pillar, a respective modified data point based on the relative distance between the data point and the center of the non-empty pillar, and further based on a cylindrical Euclidean distance from the sensor 702 to the data point. The pillar creating component 706 then transforms the plurality of data points in each non-empty pillar to the plurality of modified data points generated for that non-empty pillar. In an embodiment, for each non-empty pillar, the pillar creating component 706 generates, for each data point in the non-empty pillar, a respective modified data point based on a relative distance between the data point the center of gravity (mean location) of the points in the pillar.

For example, in an embodiment, each data point of the plurality data points is represented by 3D spatial coordinates (x, y, z), a reflectance (r), and a time stamp (t). The pillar creating component 706 transforms each data point (x, y, z, r, t) in a non-empty pillar to a respective modified data point $(x_{offset}, y_{offset}, z, r, t, d)$, where $x_{offset}$ and $y_{offset}$ are measured based on a relative distance between the data point and the center of the non-empty pillar, z is the height of the data point in the non-empty pillar, t is a timestamp, and d is a distance metric such as, for example, the cylindrical Euclidean distance from the sensor 702 to the data point. Other distance metrics are also possible. Each modified data point has D dimensions, where D is equal to the number of dimensions of the modified data point. In this example embodiment, each modified data point has D=6 dimensions: $x_{offset}, y_{offset}, z, r, t,$ and d.

In an embodiment, the pillar creating component 706 assigns a pillar index to each of the P non-empty pillars and a data point index to each of the modified data points in the P non-empty pillars. The pillar creating component 706 generates a P dimensional pillar index vector 709 that maps the pillar index of each pillar to a corresponding location (e.g., a corresponding grid cell) in the original 2D grid from which the pillar vertically extends. In some embodiments, the 2D grid is a 2D polar grid.

In an embodiment, the pillar creating component 706 generates, for all non-empty pillars and all modified data points, a 3D stacked pillar tensor 707, which is a (D, P, N) dimensional tensor having a modified data point coordinate, a pillar index coordinate, and a data point index coordinate. For each of the modified data points in the P non-empty pillars, the 3D stacked pillar tensor 707 maps a pillar index of the pillar that includes the modified data point and a data point index of the modified data point to the modified data point.

The pillar creating component 706 then generates a pillar output 708 that includes the 3D stacked pillar tensor 707 and the P dimensional pillar index vector 709.

In an embodiment, the encoder 710 is a neural network that is configured to receive the pillar output 708 and to process the 3D stacked pillar tensor 707 to generate a learned features output 712 that characterizes the features of the point cloud 703.

In particular, to generate the learned features output 712, the encoder 710 initializes a current 3D feature tensor using the 3D stacked pillar tensor 707, and iteratively performs the following steps K times, where K is a predetermined number:

1. Applying a 1×1 convolution across the modified data point index coordinate and the pillar index coordinate (i.e., across the (N, P) canvas) of the current 3D feature tensor to generate a first tensor T with size $(C^K, N, P)$.
2. Applying an element-wise maximum operator across the modified data point index coordinate of the first tensor T to generate a max matrix M with size $(C^K, P)$. In particular, the max matrix M is calculated across all modified data points in each pillar such that:

$$M_{c^K,p} = T_{c^K,n,p} \qquad (1)$$

3. Determining whether the current iteration is the $K^{th}$ iteration.
   a) If the current iteration is the $K^{th}$ iteration, outputting the current max matrix M as the learned features output 712 of the encoder 710. The output 712 is a ($C^K$, P) tensor.
   b) If the current iteration is not the $K^{th}$ iteration, generating a second ($C^K$, N, P) tensor $T_{max}$ by repeating the max matrix M for N times along the second dimension (i.e., the modified data point index coordinate) of the first tensor T, where N is the threshold number of data points in each pillar.
4. Concatenating the second tensor $T_{max}$ with the first tensor T along the first dimension (i.e., the modified data point coordinate) to generate a third tensor T' with size ($2C^K$, N, P).
5. Setting the current 3D feature tensor as the third tensor T'.

After performing the K iterations, the encoder 710 obtains the learned features output 712, which is a (C, P) tensor that includes P feature vectors, each feature vector having size C.

The 2D image creating component 714 is configured to receive the learned features output 712 from the encoder 710 and to process the learned features output 712 to generate the pseudo-image 716. The pseudo-image 716 is a 2D image that has more channels (e.g., 32, 64, or 128 channels) than a standard RGB image with 3 channels. In some embodiments, the pseudo image is a 2D feature map 1007 described with respect to FIG. 10. The 2D image creating component 714 uses the P dimensional pillar index vector 709 to scatter the dense (C, P) tensor to a plurality of locations on the pseudo-image 716 as shown in FIG. 7. That is, for each feature vector of size C in the dense (C, P) tensor, the image creating component 714 looks up the 2D coordinates of the feature vector using the P dimensional pillar index vector 709, and places the feature vector into the pseudo-image 716 at the 2D coordinates. As a result, each location on the pseudo-image 716 corresponds to one of the pillars and represents features of the data points in the pillar.

By converting a sparse point cloud 703 into the dense pseudo-image 716 that is compatible with a standard 2D convolutional architecture, the system 700 can efficiently and quickly process the pseudo-image by taking advantage of the processing power and speed of convolutional neural networks (CNNs) and GPUs. As shown in FIG. 7, the backbone neural network 718 is configured to process the pseudo-image 716 to generate an intermediate output 720 that characterizes features of the pseudo-image 716. In an embodiment, the backbone neural network is a 2D CNN that includes one or more neural network layers. The one or more neural network layers may include one or more of (i) a 3×3 convolutional neural network layer, (ii) a Rectified Linear Unit (ReLU) neural network layer, and (ii) a batch normalization neural network layer. In an embodiment, the intermediate output 720 is a feature map that has more channels than the pseudo-image 716. For example, the pseudo-image 716 has 32 channels, and the intermediate output 720 has 512 channels. As another example, the pseudo-image 716 has 32 channels, and the intermediate output 720 has 256 channels.

The object detection neural network 722 is configured to receive the intermediate output 720 from the backbone neural network 718 and to process the intermediate output 720 to detect one or more objects (e.g., the object 724) in the 3D space surrounding the sensor 702. Generally, the object detection neural network 722 is a feed-forward convolutional neural network that, given the output 720 from the backbone neural network 718, generates a set of bounding boxes for potential objects in the 3D space and classification scores for the presence of object class instances (e.g., cars, pedestrians, or bikes) in these bounding boxes. The higher the classification score, the more likely the corresponding object class instance is present in a box. An example object detection neural network 722 is described in detail in W. Liu, D. Anguelov, D. Erhan, C. Szegedy, S. Reed, C. Y. Fu, and A. C. Berg. *SSD: Single Shot Multibox Detector*. Springer, 201, available at https://arxiv.org/pdf/1512.02325.pdf. In some embodiments, a semantic segmentation head is added in parallel with the detection heads (e.g., object detection neural network 722). The segmentation head is made of a single 1×1 convolution layer. The input for the segmentation head is concatenation of the outputs from pillar feature encoder and bilinearly upsampled features from the 2D backbone 718. The segmentation head outputs a mask for each pixel that indicates whether an object is present or not present. In some embodiments, the mask indicates a class associated with the pixel. In some embodiments, range stratified convolution and normalization layers of a neural network are used on the regression branches of the detection head (e.g., classification head and bounding box regression head). Range stratified convolution and normalization layers of a neural network layers apply different convolution kernels and normalization based on a range corresponding to the changing pillar sizes in a polar grid.

The computing system 700 operates the vehicle based upon the detection of the objects in the 3D space surrounding the vehicle. For example, the system 700 can control the vehicle to drive around the detected object or to change lane to avoid collision with the object.

In an embodiment, upon the detection of the object 724, the computing system 700 provides information about the object to a predictive feedback module. The predictive feedback module then provides information to a controller of the vehicle (e.g., a controller of vehicle 102 of FIG. 1) and the controller can use the information to adjust operations of the vehicle accordingly. For example, if the computing system 700 detects a pedestrian 726 crossing the road segment, the controller receives the information about the pedestrian 726 and prepares to engage the throttle/brake at the appropriate time to reduce the speed of the vehicle. As another example, if the computing system 700 detects unexpected traffic such as multiple cars on the same lane, the computing system 700 can transmit the traffic information to the predictive feedback module. This information can be used by the controller to adjust the steering wheel, steering angle actuator, or other functionality for controlling steering angle, such that the vehicle changes to another lane with less traffic.

In examples, LiDAR data is used to perform 3D object detection and semantic segmentation. The present techniques can be applied to a real-time perception system of autonomous vehicles. Traditional object detection and semantic segmentation waits for completion of a full entire LiDAR scan before processing data from the LiDAR. In examples, a full scan is a full 360° sweep of the environment by the LiDAR. This waiting time adds a large end-to-end latency in object detection based on LiDAR data. In examples, LiDAR point clouds are a streaming data source. Streaming object detection solutions that operate on packets of LiDAR data as soon as they arrive can result in significantly reduced latency. Traditional streaming object detection solutions are not computationally and memory efficient because they ignore the natural polar representation of point cloud data. Traditional streaming object detection solutions encode a sector of point cloud data using cuboid shaped voxels, and then perform convolutions on a minimal rectangular region enclosing the sector. These traditional techniques are wasteful due to portions of a rectangular region enclosing the sector being empty, or having been processed with the preceding sector. The present techniques represent point cloud sectors as wedge-shape regions and encode the points in these sectors using polar pillars. Multiscale context padding improves the performance of a streaming object detection using smaller sectors (e.g., 360/32 degree). With regard to the sectors, some larger objects or objects close to the sensor are not fully captured by one point cloud sector. Accordingly, a context is increased by padding the features from the preceding sector across multiple scales. In some embodiments, the context is increased by padding the features from a following sector across multiple scales. The multiscale context padding adds minimal latency to the streaming object detection, as it can replace the zero-padding done traditionally in convolutional architectures. The present techniques include a streaming architecture that enables simultaneous 3D object detection and LiDAR segmentation. The streaming object detection according to the present techniques outperforms traditional streaming solutions in terms of both detection performance and latency when evaluated using a modified nuScenes dataset.

For ease of description, the present techniques are described using sensor data captured by a LiDAR (e.g., point cloud data). However, the present techniques apply to any sensor or device that captures data associated with an environment by obtaining data in a full 360° observation of the environment. For example, the sensor data may be captured by a sensor including LiDAR, scanning cameras, ultrasonic sensors, or radar. Self-driving cars (e.g., autonomous vehicles) detect and track objects in dense urban environments. These cars usually deploy a wide variety of sensors to aid in 3D object detection and tracking.

In some embodiments, LiDAR is used for object detection due to the accurate range information it provides. LiDAR based 3D object detection may also be driven in part by the availability of benchmark datasets. In examples, the LiDAR point clouds are processed as images in a bird's-eye view (BEV) or range view. Traditional LiDAR based 3D object detection techniques ignore the fact that most LiDAR sensors scan the environment sequentially as the LiDAR rotates around the z-axis. Traditional LiDAR based 3D object detection techniques instead wait for the rotational scan to complete (colloquially known as full sweep) before processing data, thereby introducing a large data capture latency (usually 50 to 100 milliseconds (ms)).

Figure 8:
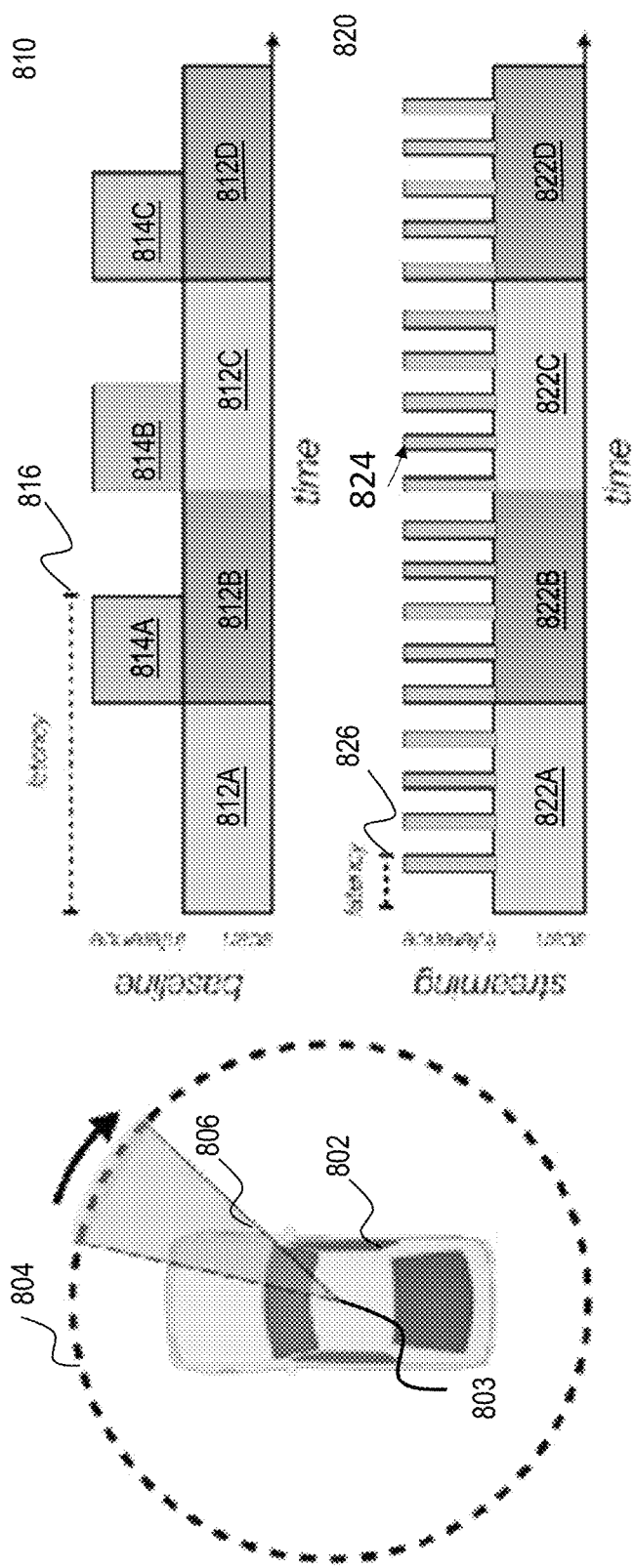
FIG. 8 shows point cloud processing with respect to time.

FIG. 8 shows point cloud processing with respect to time. In the example of FIG. 8, at field of view 804 of a sensor 803 located on a vehicle 802 is shown. The sensor 803 scans the environment with a 360° field of view, and the sensor 803 is located at the center of the field of view. For example, a LiDAR scans the environment with a 360° field of view, and point cloud data streams from the LiDAR as the scan progresses through the environment. When a first scan of the full 360° scan is completed a next 360° scan begins, resulting in a continuous stream of LiDAR data. In a streaming LiDAR application, at each timestamp a wedge-shaped sector 806 of point cloud data is streamed from the LiDAR. In some embodiments, a full 360° scan of sensor data is referred to as a frame. Each frame captures a number of sectors n. In examples, n=1, 2, 4, 8, 16, or 32 sectors.

As illustrated at reference number 810, traditional techniques capture a frame of point cloud data during time periods 812A, 812B, 812C, and 812D, and process each frame by making an inference (e.g., applying parameters to predict objects and a bounding box associated with each object) during time periods 814A, 814B, and 814C after complete capture of the frame. This results in latency 816 where the prior frame of data completes processing before the next frame of data is available. To reduce latency, streaming objection and segmentation algorithms process one packet (e.g., sector 806) of point cloud data at a time as illustrated at reference number 820. In the example of FIG. 8, capture sectors of point cloud data are captured and used for inference during object detection and segmentation during time periods 822A, 822B, 822C, and 822D. Inferences using a sector of data occurs during time periods 824 after capture of each sector. Sectors of data are readily available and processed instead of waiting for LiDAR sensors to complete a full 360-degree scan of the environment, resulting in reduced latency 826.

In some embodiments, point clouds are represented as wedge-shaped polar pillars and multi-scale context padding is used to pad multi-scale features of current packet with features from the proceeding sector to reuse features and enlarge context. In traditional techniques, point clouds are represented as cuboid-shape voxels and a current packet stream is represented as a rectangular region. In traditional techniques, an additional recurrent neural network may be used to aggregate features from proceeding packets. Memory and computation resources are wasted by representing the wedge-shaped packet as a rectangle. Moreover, the recurrent neural network does not work for packets with a relatively large angle, e.g. 90 degree or 45 degree. In traditional techniques, an additional memory module is used to aggregate features from not only proceeding sectors but also frame from previous timestamps. The accuracy of traditional streaming 3D object detection with point clouds is low for both full sweep and streaming techniques because aggregating features from a previous sweep by warping may not align well to a current sweep. In some embodiments, the present techniques enable simultaneous streaming object detection and segmentation. In examples, the stream of sectors is represented in a more natural and compact representation as polar pillars. Based on the polar pillars, the context of a current sector is enlarged by multi-scale context padding.

Figure 9A:
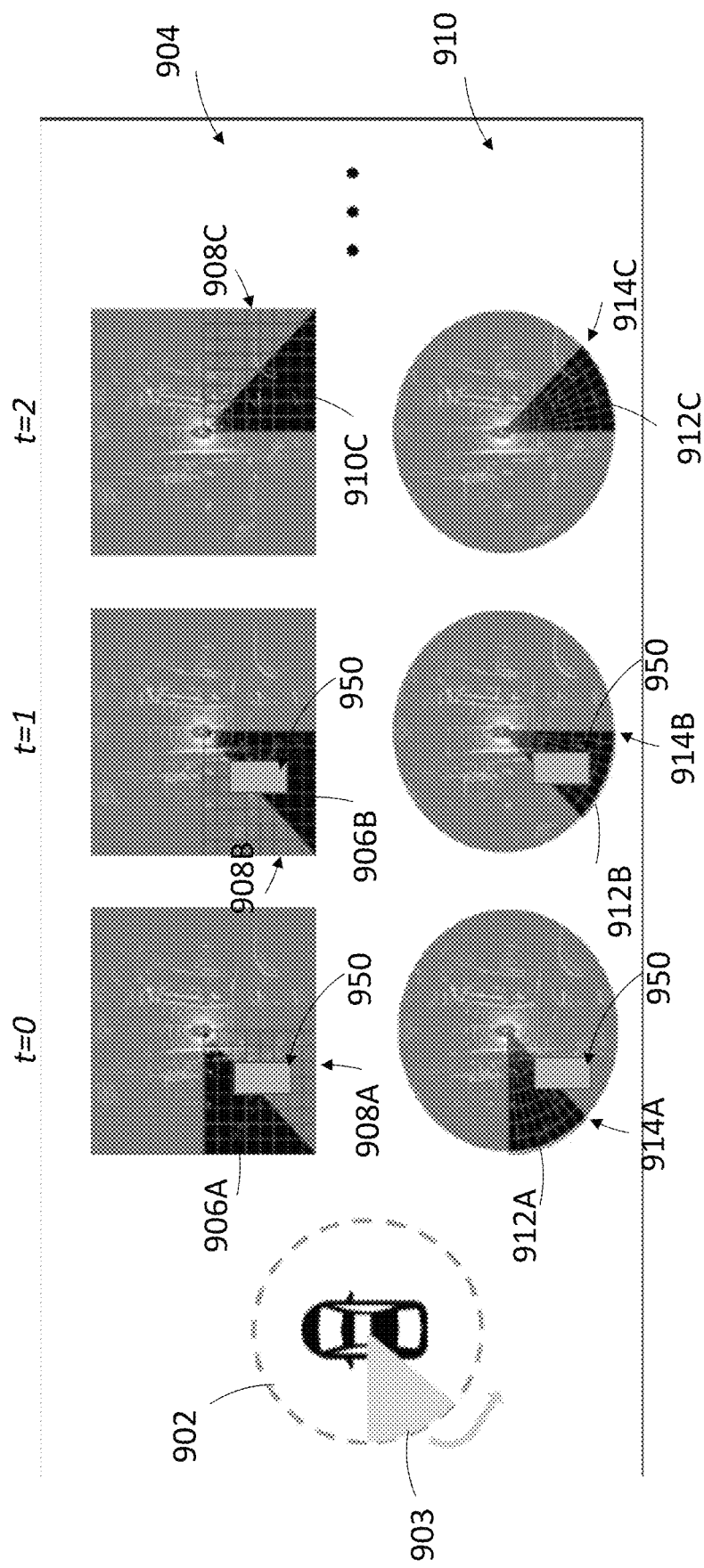
FIG. 9A shows sensor data at a bird's eye view.

FIG. 9A shows sensor data at a bird's eye view. In the example of FIG. 9A, a vehicle that includes a sensor that scans the environment with a 360° field of view 902, with the sensor located at the center of the field of view is shown. For example, a LiDAR scans the environment with a 360° field of view, and point cloud data streams from the LiDAR as the scan progresses through the environment. When a first scan is completed, a next scan begins, resulting in a continuous stream of LiDAR data. In a streaming LiDAR application, at each timestamp a wedge-shaped sector 903 of point cloud data is streamed from the LiDAR.

In traditional LiDAR based 3D object detection techniques, the LiDAR data is encoded using rectangular regions. In the example of FIG. 9A, a traditional BEV 904 with sensor data representations according to traditional techniques is illustrated at three sequential timestamps. For each timestamp t, traditional techniques process LiDAR point cloud data 906A, 906B, and 906C (collectively referred to as point cloud data 906) within respective rectangular regions 908A, 908B, and 908C (collectively referred to as rectangular regions 908). As illustrated in the traditional BEV 904, the underlying LiDAR point cloud data 906 is substantially wedge shaped due to the scanning capture of the LiDAR point cloud data. Processing the point cloud data 906 using rectangular regions 908 wastes half of memory and computation for empty regions.

In some embodiments, the sectors are preprocessed. In examples, a canonical coordinate frame is selected. The canonical coordinate frame corresponds to a position and orientation of a selected sector X of the sectors captured during scans of the environment. The point coordinates of data points of the sectors n are rotated to the same position and orientation of the selected sector X. In this manner, the sectors are transformed to a canonical coordinate frame prior to processing into pillars. The preprocessing improves the resulting object detection and segmentation, as the rotation to a canonical coordinate frame reduces variation in point coordinates within each sector. In examples, the sectors are rotated prior to training and inference. For example, the LiDAR point cloud sectors are rotated to align with the first sector in the scene. During training, the annotations (e.g., labels) associated with each sector are also rotated. When making object predictions during inference, the detections on the rotated sector are transformed back to their original sector positions to recover the entire scene.

The present techniques process the LiDAR point cloud data as wedge-shape sectors using polar grids. The wedge shaped sectors correspond to the natural shape of LiDAR point cloud data. In the example of FIG. 9A, a BEV 910 of point cloud data is illustrated at three sequential timestamps. For each time instance, LiDAR point cloud data 912A, 912B, and 912C (collectively referred to as point cloud data 912) within respective sectors 914A, 914B, and 914C (collectively referred to as sectors 914) is processed. As illustrated, the shape of each sector 914 matches the shape of LiDAR point cloud data 912 captured at each timestamp. Processing the point cloud data 912 using sectors 914 reduces empty regions and efficiently makes use of memory and computation resources at each time instance.

Figure 9B:
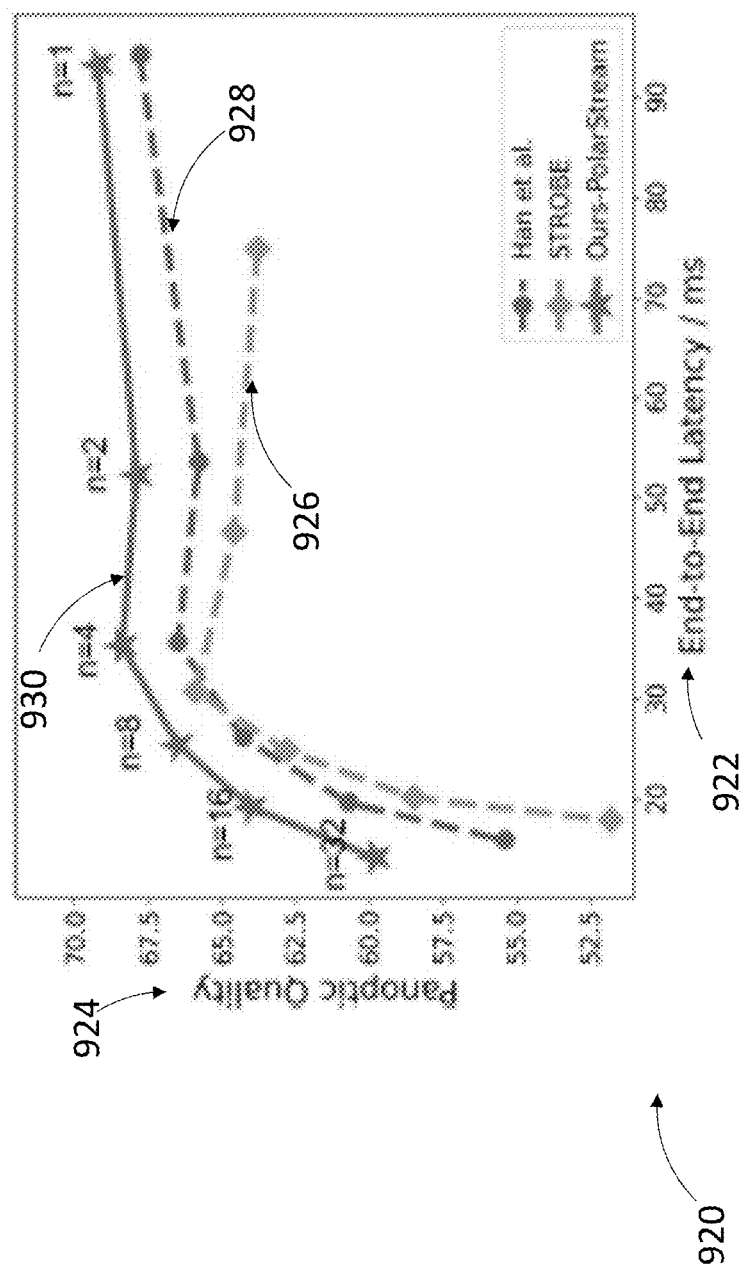
FIG. 9B is a graph that shows a comparison of streaming techniques.

FIG. 9B is a graph 920 that shows a comparison of streaming techniques. In FIG. 9A, end to end latency 922 is plotted along the x-axis, and panoptic quality is plotted along the y-axis 924. In some embodiments, a panoptic quality refers to the accurate identification of objects and stuff in the environment. In some embodiments, stuff refers to objects, items, or things in the environment that are continuous and are not distinct objects. In examples, stuff refers to classes such as drivable surface, sidewalks, and the like. A line 930 illustrates latency associated with the selection of a particular number of sectors n. In the example of FIG. 9B, a full sweep of LiDAR data is divided into n=1, 2, 4, 8, 16, and 32 sectors. As illustrated, the present techniques result in a higher panoptic quality when compared with other techniques plotted at line 926 and line 928.

In some embodiments, training the machine learning models is done by simulating a streaming a dataset. The simulated streaming LiDAR dataset is split into training, testing, and validation datasets. In examples, the dataset is a public large-scale dataset for autonomous driving that enables the study of challenging urban driving situations using a full sensor suite of a real self-driving car. For example, a streaming system is simulated from a dataset such as the NuScenes dataset. The streaming system is simulated by artificially slicing the input points taken from the NuScenes dataset into n sectors according to their azimuth. Referring again to FIG. 9A, each sector is like a slice of a full pizza. The number of sectors n=1, 2, 4, 8, 16, or 32, where n=1 means full sweep. In examples, the simulated dataset includes 1,000 scenes, with 700 scenes for training, 150 scenes for validation and 150 scenes for testing. Each scene is twenty seconds in duration and captured by a 32-beam LiDAR. In examples, 40,000 frames are annotated in total, including 10 object classes such as cars, motorcycles and pedestrians. Other stuff classes include vegetation and drivable regions. For ease of description, 10 object classes are considered for object detection and 16 classes in total are considered for semantic segmentation and panoptic segmentation, including object classes and stuff classes. However, any number of classes can be used.

Individual LiDAR sectors are processed into pillars as they arrive from the LiDAR. In some embodiments, the LiDAR sectors are rotated to a canonical coordinate frame prior to being processed into pillars. A streaming based architecture achieves significant latency gains (e.g. $1/15$th to $1/3$rd of peak latency) over the traditional non-streaming baselines, as illustrated in FIG. 9B. The present techniques process the LiDAR data using the natural polar representation formed by the individual LiDAR sectors. Using cuboid-shaped representations restricts convolutions to a minimal rectangular region enclosing a point cloud sector, where a substantial portion of the rectangular region contains no point cloud data. Thus, the cuboid-shaped representations wastes both computation and memory resources. As shown in FIG. 9A, a large portion of the enclosed rectangular region will be empty.

Referring again to FIG. 9A, an object 950 is detected in the environment at timestamps t=0 and t=1. The vehicle and sensor are located at the center of the field of view. As a result, objects close to the vehicle can be fragmented across multiple sectors as shown by the object 950 in FIG. 9. In examples, portions of the object observed by individual LiDAR sectors at each time stamp is limited to the data in each sector. The present techniques encode individual point cloud sectors using polar pillars as described with respect to FIG. 7. Polar pillars naturally address the inefficiency of existing streaming approaches by representing the point cloud sectors as more compact wedge-shaped regions as shown in FIG. 9A. In some embodiments, to enhance the context available to the model, the representation of the previous sector is padded across multiple strides of the backbone as described with respect to FIGS. 10 and 11. In some embodiments, the multi scale context padding replaces the zero-padding done commonly in convolutional neural networks, thereby not adding any latency.

Figure 10:
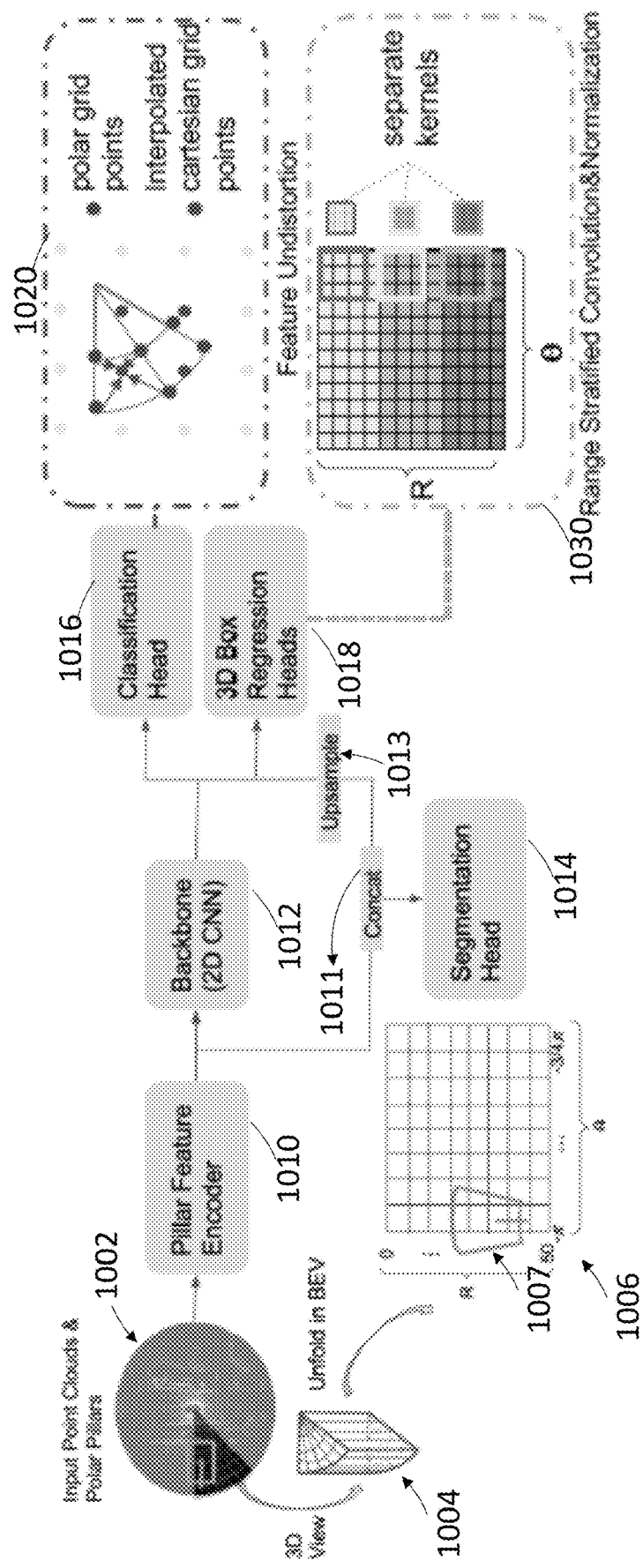
FIG. 10 is an illustration of simultaneous LiDAR object detection and segmentation network with polar pillars.

FIG. 10 is an illustration of a simultaneous LiDAR object detection and segmentation network 1000 with polar pillars. The network 1000 can include polar pillar encoding at described with respect to FIG. 7. The point cloud data is streamed as described with respect to FIGS. 9A and 9B. In some embodiments, the present techniques enable PolarStream, where PolarStream is a streaming model based on polar pillars. LiDAR streaming data is prepared, polar pillars are used as a representation for LiDAR point clouds, and a simultaneous detection and segmentation model is provided that improves object detection. Multi-scale context padding is used to enlarge context of each sector. The network 1000 as described herein is a simultaneous detection and segmentation network. In examples, the network 100 includes a pillar feature module 1010 to encode point clouds features to pillar features, a 2D backbone 1012 to extract extra deep features, a classification head 1016 and bounding box regression head 1018 for 3D object detection, a semantic segmentation head 1014 for pixel-based semantic segmentation. The network 1000 achieves panoptic segmentation by combining the outputs of the semantic segmentation and object detection.

A BEV 1002 of point cloud data is shown. Sectors 1004 of LiDAR point cloud data are streamed to the pillar feature module 1010. In examples, the pillar feature module 1010 is the pillar processing module 701 described with respect to FIG. 7. In examples, the pillar feature encoder is described with respect to FIGS. 12-15. In some embodiments, the pillar feature module 1010 includes a mini PointNet that converts point features into 2D grid-structure pillar features. The pillar feature module 1010 divides the 2D ground plane into a 2D polar grid with different grid cell sizes. The point cloud is streamed to a polar feature encoder of the pillar feature module 1010 using sectors that include a plurality of data points that represent a plurality of objects in 3D space surrounding the vehicle. In examples, each data point of the plurality data points is represented by polar coordinates (r, θ), a reflection intensity (i), and a time stamp (t).

Each sector 1004 consists of N points, each represented by a vector of point feature $f_p=(r_p, \theta_p, z_p, x_p, y_p, i_p, t_p)$, where $(x_p, y_p, z_p)$ is its Cartesian coordinates. $(r_p, \theta_p)$ is the polar coordinates. $i_p$ is the reflection intensity and $t_p$ is the timestamp when the LiDAR point is captured. Points are accumulated from ten successive frames in total to obtain denser point clouds. The points from previous frames are motion-compensated and transformed to the current frame. The data points are grouped according to the cylindrical pillar resolution (δr, δθ, δz) where $\delta z = z_{max} - z_{min}$ so there is only one pillar along the height dimension. In some embodiments, the present techniques include dynamic voxelization to sample all points within each pillar, instead of randomly sampling a fixed number of points per pillar.

Each data point of the plurality of data points of a sector is assigned to a pillar in the plurality of polar pillars. The polar pillars are input to an encoder (e.g., encoder 710 of FIG. 7) that generates a feature map 1006. The encoded pillars-wise features on the polar grid are unfolded to into a rectangular feature map 1006. The rectangular feature map 1006 is used for convolution at the backbone 1012. As shown at the rectangular feature map 1006, the object 1007 is distorted, where a first end of the object nearest the sensor appears larger than the actual object size and a second end of the object farthest from the sensor appears smaller than the actual object size.

The polar BEV representation of point cloud data balances the points across grid cells of the 2D polar grid. As illustrated at the rectangular feature map 1006, the objects (e.g., object 1007) can be distorted when the polar pillars are unfolded to a rectangular representation to enable the use of convolutional layers in the object detection model. The amount of distortion varies with range as the pillars far away from the sensor have a larger size as compared to the pillars close to the sensor. The varying amount of distortion with range makes a polar representation not compatible with the translation-invariance property of convolution.

The feature map 1006 is simultaneously input to a backbone 1012 and a segmentation head 1014. On top of the network 1000 are object detection heads, including a classification head 1016 and a bounding box regression head 1018. As used herein, the terms backbone and head refer to the structure of the network 1000. In examples, a backbone extracts features from data and one or more heads performs a predetermined task using the features. In some embodiments, the backbone 1012 upsamples the features input to the backbone and applies multi-scale context padding as described with respect to FIG. 11.

In examples, the backbone 1012 and segmentation head 1014 form an architecture that supplements a contracting network by successive layers, where pooling operations are replaced by upsampling operators 1013. Hence these layers increase the resolution of the output of the segmentation head 1014. A successive convolutional layer at the segmentation head 1014 learns to assemble a precise output based on this upsampled output of the backbone 1012. In some embodiments, the segmentation head is a single 1×1 convolution layer. The input for the segmentation head are concatenated outputs 1011 from pillar feature module 1010 and bilinearly upsampled features from the 2D backbone 1012. In some embodiments, the backbone 1012 and segmentation head 1014 form a U-Net like structure. The segmentation head 1014 outputs an image of the environment, and each pixel of the environment includes a Boolean value that indicates if an object is present or not present. In some embodiments, the image is a mask.

As shown in FIG. 10, the segmentation head 1014 is in parallel with the detection heads (e.g., classification head 1016 and bounding box regression head 1018). In some embodiments, the classification head 1016 and bounding box regression head 1018 first detect centers of objects using a keypoint detector, and then regress to other attributes, including 3D size, 3D orientation, and velocity. Next, the classification head 1016 and bounding box regression head 1018 refine these estimates using additional point features on the object. In examples, 3D object tracking simplifies to greedy closest-point matching. For example, the classification head 1016 and bounding box regression head 1018 include modified CenterPoint heads with modifications for compatibility with polar pillars. To assign targets to an 11-class heatmap to indicate the objects as generated by the classification head 1016, the Gaussian radius of the object center is computed using the span of range and azimuth of the object bounding box, instead of using length and width of the box. Following CenterPoint, the present techniques regress a center offset as $d_x, d_y$, the bounding box size l,w,h as logl,logw,logh, and predict the bounding box height z. The present techniques regress the relative bounding box orientation φ as cos φ, sin φ and relative velocity as $v_x, v_y$. In some embodiments, a single-group detection head is used to balance accuracy and speed. In some embodiments, for streaming data with n>1, non-maximum suppression (NMS) is applied for detection within the current sector.

In some embodiments, the outputs of the segmentation head 1014, classification head 1016, and bounding box regression head 1018 are used for panoptic segmentation. In panoptic segmentation, for each point belonging to things, an instance identification is predicted as the box identification whose category is the same and center is the nearest. For streaming data n>1, stateful panoptic fusion is implemented, i.e. assign instance identifications according to the boxes from current sector and previous sectors of the same sweep. In some embodiments, a total loss of the network 1000 is the weighted sum of losses for each component. For example, focal loss is used for the classification head 1016, and an L1 loss is used for the orientation estimation and velocity estimation of the bounding box regression head 1018. For the segmentation head 1014, a weighted cross-entropy loss and Lovasz-Softmax loss is used.

In some embodiments, feature undistortion 1020 is applied to the classification head 1016 to mimic bilinear sampling and interpolate Cartesian pillar features from polar pillar features. Range stratified convolution and normalization 1030 is applied to a center offset of the regression head 1018. In examples, the feature undistortion 1020 transforms the polar representation into a canonical Cartesian representation for input to the classification head 1016. In an example, range stratified convolution and normalization 1030 applies convolution layers on the regression branches of the detection head. The range stratified convolution and normalization 1030 layers apply different convolution kernels and normalization based on a range to cater to the changing pillar sizes in a polar grid. In this manner, the present techniques enable object detection using a polar grid that performs with accuracies similar to or better than 3D object detection models using Cartesian representations, without adding any significant latency.

Feature undistortion 1020 undistorts the features in the feature map 1006. For example, feature undistortion removes distortion in features associated with the object 1007, as in some cases objects have distorted appearances with polar pillars. In some embodiments, feature undistortion 1020 interpolates features at Cartesian pillar locations using the original polar pillar locations so that the translation-invariant property of convolution applies. The connection of bilinear sampling to convolution is found and bilinear sampling is mimicked using convolution. For bilinear sampling, the interpolated features at point p can be sampled from its neighboring points $N_p$:

$$f_p = \sum_{p_k \in N_p} w_k f_{pk} \quad (2)$$

where $w_k$ is a function of distance(p, $p_k$).

In some embodiments, Equation 2 has a similar form to convolution, except that for convolution $w_k$ is fixed because same kernel is slid through every location of the feature map. To make $w_k$ distance-dependent, Equation 2 is modified by adding a new parameter $w_k'$ so Equation 1 can be rewritten as:

$$f_p = \sum_{p_k \in N_p} w_k w_k' f_{pk} \quad (3)$$

where $w_k'$ is conditioned on distance(p, $p_k$). In some embodiments, $w_k'$ is modeled as the output of a neural network. A fully convolutional network g takes position encodings at $p_k$ and its neighboring points $N_{pk}$, i.e. $\{pe_i=(r_i, \cos\theta_i, x_i, y_i) | i \in N_{pk} \cup p_k\}$ as input, and output $w_k'$. For example:

$$w_k' = g(\{pe_i\}) \quad (4)$$

A bias term $b_k'$ is added and another standalone network q is added so that $b_k' = q(\{pe_i\})$ and $$f_p = \sum_{p_k \in N_p} w_k(w_k' f_{pk} + b_k') \quad (5)$$

where g and q are trained together with a main network (e.g., network 1000 of FIG. 10), and during inference $w_k'$ and $b_k'$ are fixed for each location $p_k$ so it does not need extra runtime for g and q. In some embodiments, feature undistortion is applied in center heatmap prediction.

Range stratified convolution and normalization 1030 is applied to a center offset. In some cases, the center offset of polar pillars is dependent on a range and azimuth of data points within the pillar. Accordingly, the pillar has different statistics (e.g., center offset, orientation, etc.) at different regions. For example, suppose a heatmap center is at $(r_c, \theta_c)$ and the target is at $(r_t, \theta_t)$. The center offset is:

$$d_x = r_t \cos\cos\theta_t - r_c \cos\cos\theta_c \quad d_y = r_t \sin\sin\theta_t - r_c \sin\sin\theta_c \quad (6)$$

For simplicity, assume $r_t = r_c$, i.e. the center offset moves along a circle. Suppose $\theta_t > \theta_c$ then $$\theta_t = \theta_c + \theta_s < \theta_c + \delta\theta \quad (7)$$

where $\theta_s$ is a small angle and $\delta\theta$ is the polar pillar angle size. Then $$d_x = r_c(\theta_c + \theta_s) \approx -r_c \theta_s \sin\sin\theta_c \quad (8)$$

Similarly, in examples $d_y$ is derived and is dependent on range and azimuth. In examples, for Cartesian pillars center offset ranges from −1 to 1 and mean is 0.49 and standard deviation is 0.28, while polar pillars center offset ranges from −2 to 2, mean is 0 and standard deviation is 0.64. The polar standard deviation is much larger than that for Cartesian pillars. In some embodiments a range stratified convolution and normalization is implemented as an alternative to regular convolution and batch normalization. Range stratified convolution applies individual kernels at different ranges and range stratified normalization only normalizes over individual regions within certain range instead of entire spatial dimension. In some embodiments, range stratified normalization is a special case of instance normalization. The present techniques include range stratified convolution and normalization applied to center offset regression. In some embodiments, the present techniques also apply range stratified convolution normalization to the shared convolution for detection heads. In some embodiments, the detection head includes the classification head 1016 and the regression head 1018. The detection head includes shared convolution layers which are then split into task-wise convolutional layers that predict the center offsets, velocity, etc.

Figure 11:
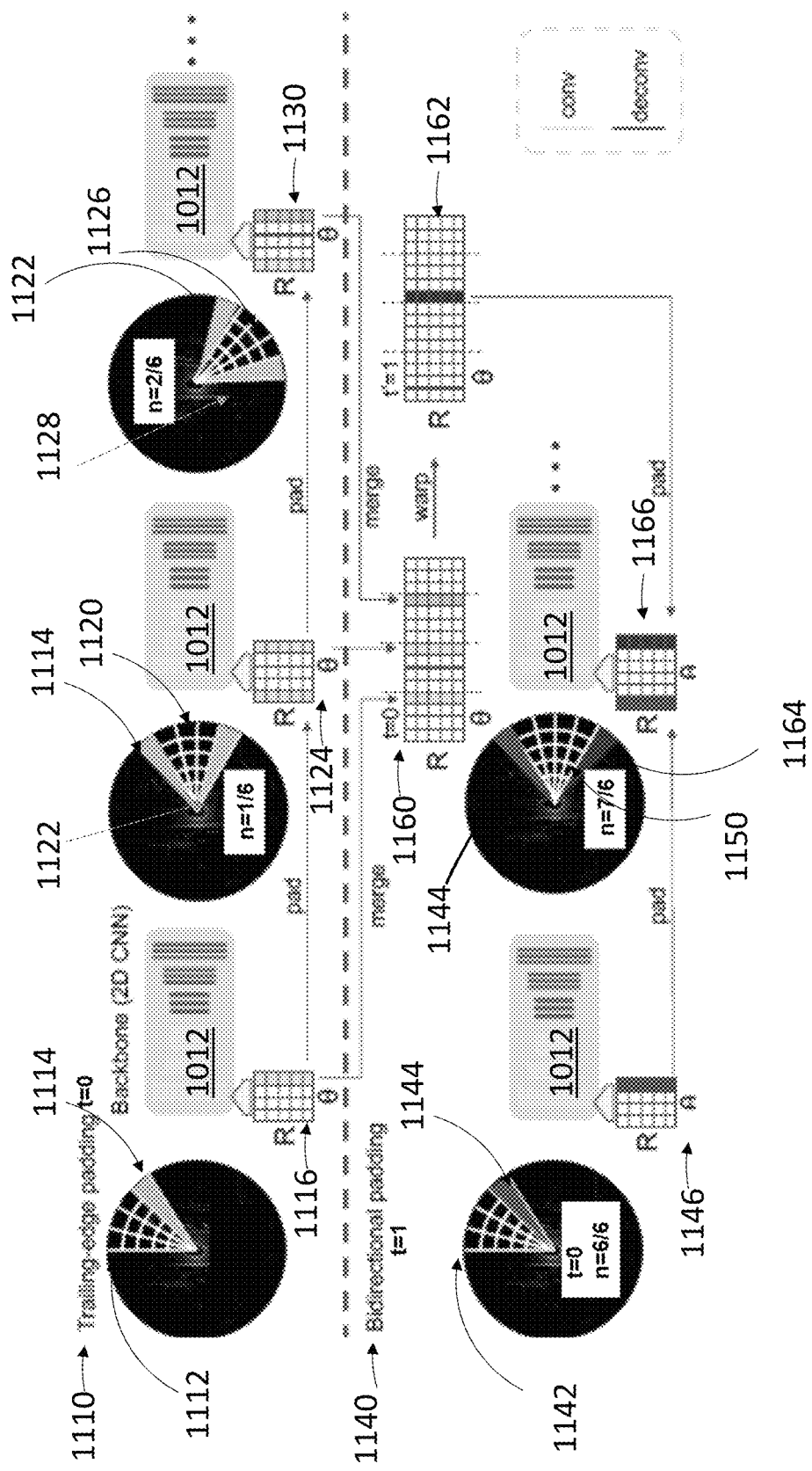
FIG. 11 shows multi-scale context padding.

FIG. 11 shows multi-scale context padding. In some embodiments, multi-scale context padding is implemented in every convolution layer in the 2D backbone (e.g., backbone 1012). The context padding is applied at different strides of the backbone, where the backbone reduces a size of the feature map provided as input. In examples, a context includes two components. The first component of context is feature values that include texture information. The second component of context is a spatial relation to the object of interest. Since convolution is translation-invariant, convolutional neural networks alone do not encode spatial relation. The spatial relation is maintained in the spatial arrangement of neurons on the feature map. Padding along the feature map edges according to the present techniques both adds feature values and maintains the spatial relation of context.

In the example of FIG. 11, trailing edge padding is illustrated at reference number 1110. Bidirectional padding is illustrated at reference number 1120. The present techniques efficiently use the memory by implementing a more compact and natural representation for the packet streams. Unlike previous methods which use an additional recurrent module, the multi-scale context padding provides context to current packet without introducing extra computation, as just replace zero-padding by context padding.

In some embodiments, a current sector is padded with features from other sectors. In some embodiments, a perception system learns additional context from a preceding packet. Features are reused from the preceding packet without computing the same features again. In traditional techniques, convolution layers in a deep neural network pad the input with zeros along the borders. The present techniques replace zero-padding with the padding using features from proceeding packets. In FIG. 11, at reference number 1110 trailing edge padding is performed for a first full sweep of the environment, beginning with time t=0. At reference number 1140, bi-directional padding is performed for a second full sweep of the environment at time t=1. For ease of description, at each of time t=0 and time t=1, the number of sectors is n=6. However, any number of sectors can be used. The sectors are obtained sequentially, so that at reference number 1110, in trailing edge padding sector 1112 is a last sector of a preceding sweep at time t=−1, sector 1120 is the first of six (n=1/6) sectors for time t=0, and sector 1126 is the second of six (n=2/6) for time t=0. At reference number 1140, in bidirectional padding, sector 1142 is the last of six (n=6/6) sectors for time t=0, sector 1150 is the first of six (n=1/6) sectors for time t=1.

At reference number 1110, trailing-edge padding pads a current sector with features from a preceding sector. A preceding sector 1112 of point cloud data is shown with a trailing edge 1114 at timestamp t=−1. As shown in FIG. 11, the preceding sector is unfolded to a rectangle feature map 1116 on the r-θ plane as input to convolution/deconvolution at the backbone 1012. The LiDAR sectors arrive one after another by increasing the angle at which the sensor scans so the unfolded feature map of a sector is spatially connected to its preceding sector along the θ dimension. Since the unfolded feature map of a sector is spatially connected to its preceding sector along the θ dimension, the feature maps are padded with the features from preceding sector along the θ dimension where it is spatially connected to current sector. The receptive field of a neuron increases as the neural network goes from a bottom layer to a top layer, and the network encodes multi-scale representation of the input at different stages. Accordingly, context is padded from a preceding sector before every convolution of the 2D CNN backbone, as illustrated in trailing-edge padding of FIG. 11.

As illustrated in FIG. 11, the first sector 1120 at timestamp t=0 is spatially connected to a trailing edge 1114 of the preceding sector 1112. The trailing edge pads the rectangular feature map 1124 generated using the first sector 1120. The rectangular feature map 1124 is input to the backbone 1012 for convolution/deconvolution. A second sector 1126 at timestamp t=0 is spatially connected to a trailing edge 1122, which is obtained from the first sector 1120 at timestamp t=0. The trailing edge 1122 pads the rectangular feature map 1130 generated using the second sector 1126. The rectangular feature map 1130 is input to the backbone 1012 for convolution/deconvolution. Edge 1128 is used to pad a next sector. By padding a few columns of the feature map, the neural network of the backbone 1012 is replenished with sufficient context from multiple ranges and multiple scales at different stages of the neural network. In some embodiments, zero-padding is used for r dimension and the other end of the θ dimension, as the other end of θ dimension points to the future sector.

Bidirectional padding is shown at reference number 1140. In bidirectional padding, the current sector is padded with features from the preceding sector and features from following sector of past time frame. For padding from the 'following' sector, full-sweep multi-scale feature maps are aggregated from previous time frame. The feature maps are warped to the coordinate system of current time frame using ego-motion compensation. The current sector is padded with the corresponding warped features where they are spatially connected to current sector.

In the example of FIG. 11, bidirectional padding is illustrated using the first sector 1150 captured at time t=1. An edge 1144 of the preceding sector 1142 is used to pad the next sector in bidirectional padding. The edge 1144 pads the rectangular feature map 1146 generated using the sector 1142. For padding from the following sector, full-sweep multi-scale feature maps are aggregated from previous time frame t=0. Thus aggregated feature maps, 1160 include feature maps 1116, 1124, and 1130 as generated at time t=0. The aggregated feature maps 1160 are warped to the coordinate system of current time frame t=0 using motion compensation, resulting in warped feature map 1162. The first sector 1150 at time t=1 is padded with the corresponding warped features from time t=0, where they are spatially connected to current sector. Edge 1164 shows the warped features. Accordingly, in bidirectional padding full-sweep feature maps are merged for a past time frame and warped to the coordinate system of current time by ego-motion compensation. The feature map 1166 is generated using the padded sector 1150, and input to the backbone 1012 for convolution/deconvolution.

Example Point Clouds and Pillars

FIG. 12 illustrates an example point cloud and pillars. In some embodiments, the pillars are polar pillars.

The point cloud 1200 has a plurality of data points 1202. In this embodiment, each data point is a 5-dimensional data point having a spatial location (x, y, z), reflectance (r), and time stamp (t). The time stamp allows multiple LiDAR or RADAR sweeps to accumulate data points as inputs for a single prediction/detection of the objects. Each of the data points is assigned into one of the B=H×W pillars. Each pillar is a z-column that extends from a portion of the 2D ground plane 1204 in the z direction. As described above in reference to FIG. 10, a pillar processing module is configured to transform each of the data points having an original presentation to a respective modified data point having a different presentation. For example, as shown in FIG. 12, data point 1206 in a non-empty pillar 1212 has an original 5-dimensional representation including 3D spatial coordinates (x, y, z), a reflectance (r), and a time stamp (t). The pillar processing module transforms the data point 1206, represented by (x, y, z, r, t), to a respective modified data point represented by ($x_{offset}$, $y_{offset}$, z, r, t, d), where $x_{offset}$ and $y_{offset}$ are measured based on a relative distance between the data point 1206 and the center 1210 of the non-empty pillar 1212, where z is the height of the data point in the non-empty pillar, r is the reflectance, t is the timestamp, and d is the cylindrical Euclidean distance from a sensor 1201 to the data point 1206.

Figure 15:
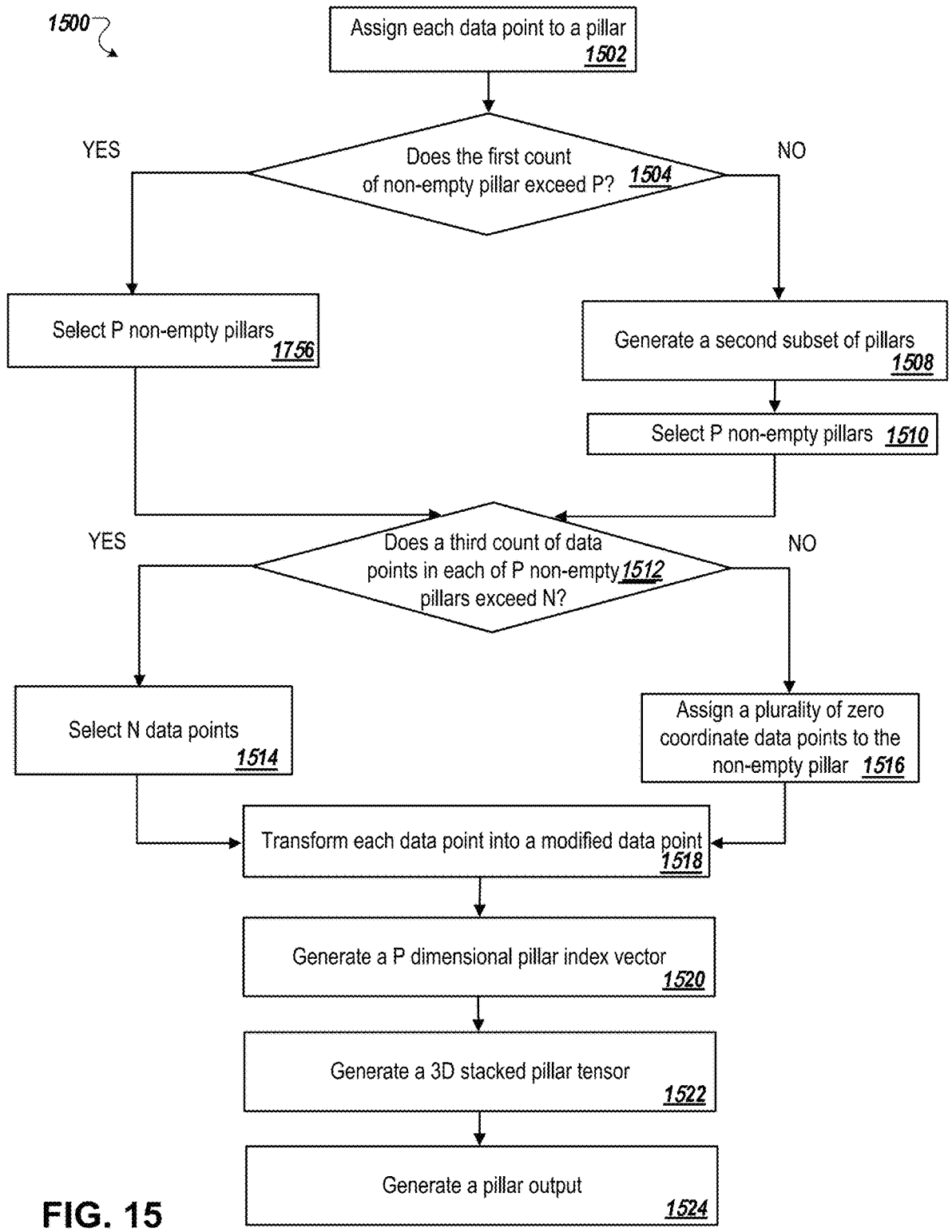
FIG. 15 is a flow chart of an example process for assigning each of the plurality of data points to a pillar of the plurality of pillars and processing the plurality of pillars to generate a pillar output.

In an embodiment, the 2D ground plane 1204 is divided into multiple grid cells having the same dimensions, and thus the plurality of pillars extending vertically (in the Z-direction) from these grid cells also have the same volume. However, in other embodiments, the 2D ground plane can be divided into multiple grid cells having different sizes as shown in FIG. 15 below.

Figure 13:
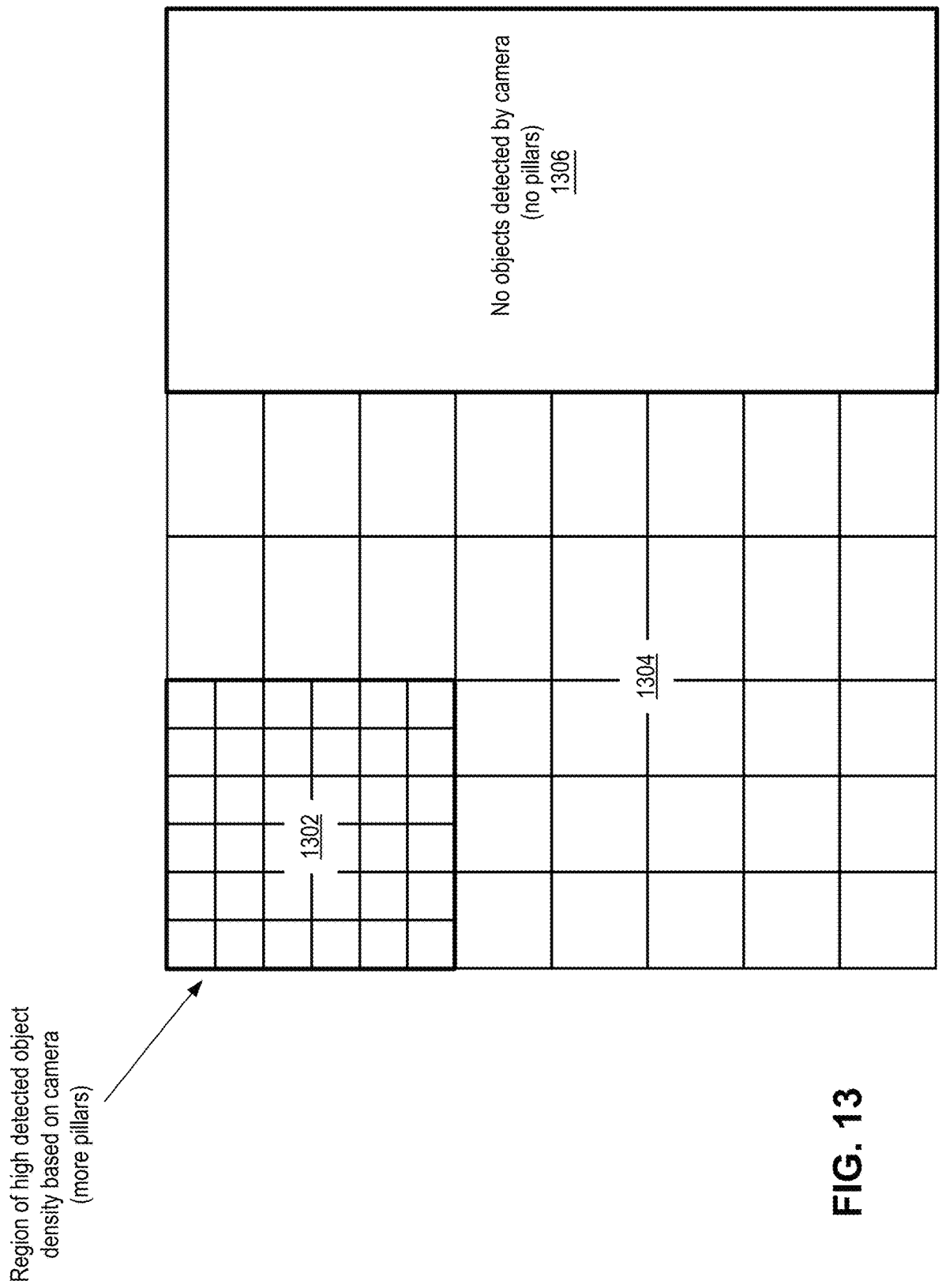
FIG. 13 illustrates an example 2D ground plane of a point cloud.

FIG. 13 illustrates an example 2D ground plane of a point cloud. The 2D ground plane is divided into multiple grid cells that have different cell sizes, depending on the density of objects in the 3D space.

As shown in FIG. 13, region 1302 has a high density of detected objects based on another sensor of the vehicle (e.g., a camera, RADAR, sonar). Therefore, region 1302 has a smaller grid cell size, which means there are more pillars in the region 1302 to capture more information about the objects in the region 1302. In an embodiment, each pillar in the region 1302 has more data points allowed in each pillar than other regions with lower object density. In contrast, region 1306 does not have any objects detected by the camera. Thus there is no pillar in the region 1306. Region 1304 has a moderate density of detected objects, therefore having more pillars than region 1306 but less pillars than the region 1302. Generally, the threshold value N is greater for pillars located in the region of high object density and smaller for pillars located in the region of low object density.

Figure 14:
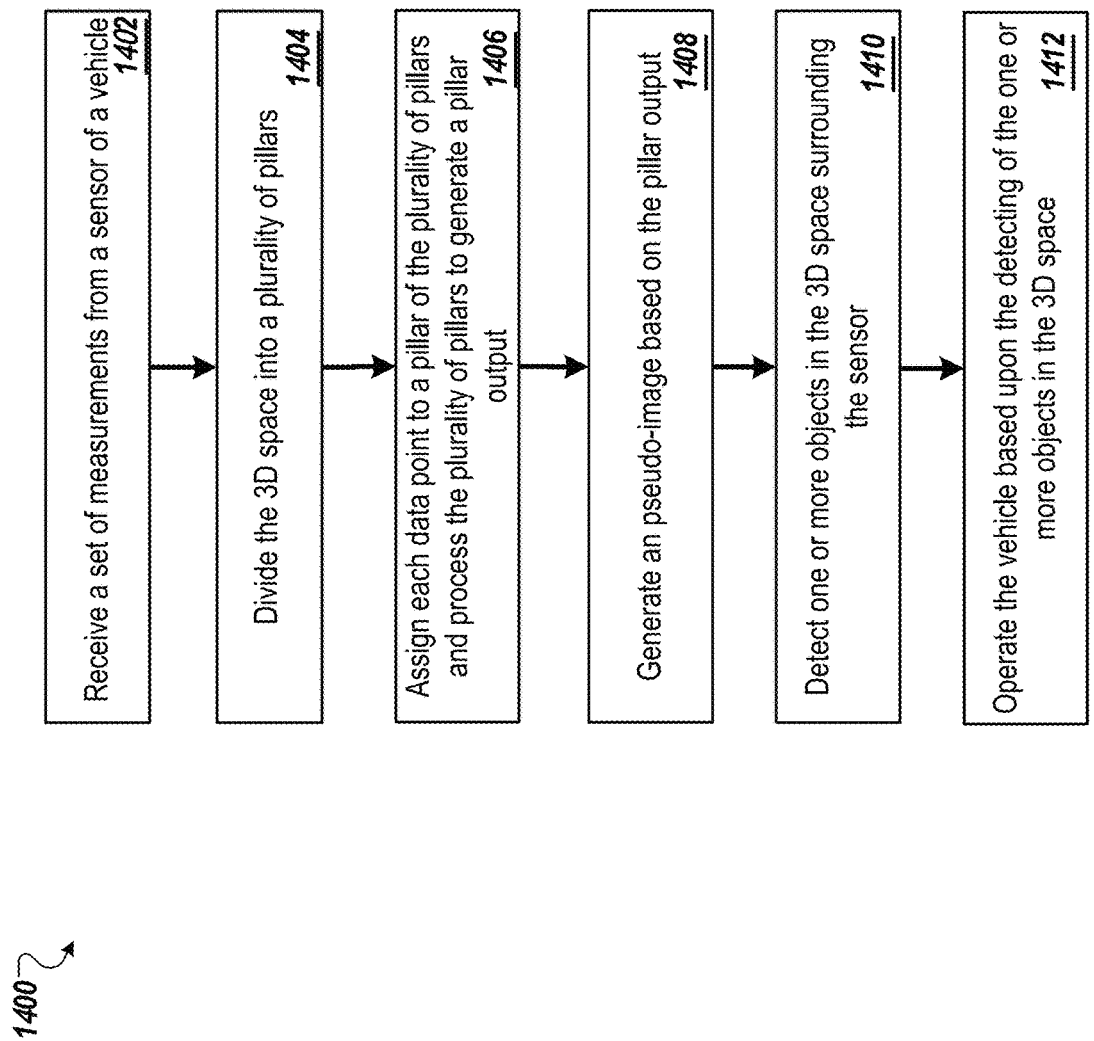
FIG. 14 is a flow chart of an example process for detecting objects in the environment and operating the vehicle based on the detection of objects.

Example Process for Detecting Objects and Operating the Vehicle Based on the Detection of the Objects FIG. 14 is a flow chart of an example process 1400 for detecting objects in the environment and operating the vehicle based on the detection of objects. For convenience, the process 1400 will be described as being performed by a system of one or more computers located in one or more locations. For example, the vehicle 102 of FIG. 1, vehicle 200 of FIG. 2, device 300 of FIG. 3, or autonomous vehicle compute 400 of FIG. 4, appropriately programmed in accordance with this specification, can perform the process 1400.

Process 1400 begins when the system receives a set of measurements from a sensor of a vehicle (step 1402). In particular, the system receives a point cloud from a LiDAR or RADAR. The point cloud includes a plurality of data points that represent a plurality of objects in a 3D space surrounding the vehicle. For example, the plurality of data points represent a plurality of objects including one or more of a vehicle (e.g., a car, a bike or a truck), a pedestrian, an animal, a static obstacle, or infrastructure (e.g., traffic lights). Each data point of the plurality of data points is a set of 3D spatial coordinates, for example, (x, y, z) coordinates.

Process 1400 continues when the system divides the 3D space into a plurality of pillars (step 1404). In some embodiments, the pillars are polar pillars. Each pillar of the plurality of pillars extends vertically from a respective portion of the 2D ground plane (e.g., the x-y plane) of the 3D space. In some embodiments, the system divides the 2D ground plane into a 2D grid that has grid cells having the same size, and therefore the pillars extending vertically (in the z-direction) from these 2D grid cells have the same volume. In some embodiments, the system divides the 2D ground plane into a 2D grid with different grid cell sizes. For example, system detects in the point cloud a density of objects using additional input from other sensors such as a camera or RADAR. The system generates a 2D grid with different grid cell sizes so that there are more pillars located in the region of high object density, less pillars located in the region of low object density, and no pillars in the region of no objects.

Process 1400 continues when the system assigns each data point of the plurality of data points to a pillar in the plurality of pillars and process the plurality of pillar to generate a pillar output (step 1406). Generally, each data point of the plurality of data points is assigned to a respective pillar based on the 2D coordinates of the data point. That is, if the 2D coordinates of a data point are within a particular portion of the 2D ground plane from which a particular pillar extends, the data point is assigned to that particular pillar. The system then transforms each of the data points into a respective modified data point based on a relative distance between each data point and the center of the point pillar that includes the data point and a cylindrical Euclidean distance from the sensor to the data point. The system processes the plurality of pillars and modified data points to generate a pillar output that includes a 3D stacked pillar tensor and a P dimensional pillar index vector. The process for assigning data points to the plurality of pillars and processing the plurality of pillars to generate the pillar output is described in detail below with reference to FIG. 15.

Process 1400 continues when the system generates a pseudo-image based on the pillar output (step 1408). The system generates a learned features output that characterizes features of the plurality of pillars and processes the learned features output to generate the pseudo-image.

To generate the learned features output, the system initializes a current 3D feature tensor using the 3D stacked pillar tensor, and iteratively performs the steps K times, as described in reference to FIG. 7.

Process 1400 continues when the system detects the plurality of objects in the 3D space surrounding the sensor based on analyzing the pseudo image (step 1410). In an embodiment, the system detects the plurality of objects using a backbone neural network and an object detection neural network. In particular, the system processes the pseudo-image using a backbone neural network to generate an intermediate output, as described in reference to FIG. 7. The system processes the intermediate output using the object detection neural network to detect one or more objects in the 3D space surrounding the sensor. In an embodiment, the object detection neural network is a feed-forward CNN that, given the intermediate output, generates a set of bounding boxes for potential objects in the 3D space and classification scores for the presence of object class instances (e.g., cars, pedestrians, or bikes) in these bounding boxes. The higher the classification score, the more likely the corresponding object class instance is present in a bounding box.

Process 1400 continues when the system operates the vehicle based upon the detecting of the plurality of objects in the 3D space surrounding the vehicle (step 1412). For example, the system controls the vehicle to drive around the detected object or to change lanes to avoid the object. In an embodiment, upon the detection of an object, the system provides information about the object to a predictive feedback module. The predictive feedback module then provides information to a controller of the vehicle and the controller uses the information to adjust operations of the vehicle accordingly. For example, if the system detects a pedestrian crossing the road segment, the controller receives the information about the pedestrian and prepares to engage the throttle or brake at the appropriate time to reduce the speed of the vehicle. As another example, if the system detects an unexpected traffic, such as multiple cars on the same lane, the system can transmit the traffic information to the predictive feedback module. This information is used by the controller to adjust the steering wheel, steering angle actuator, or other functionality for controlling steering angle, such that the vehicle changes to another lane with less traffic.

FIG. 15 is a flow chart of an example process 1500 for assigning each of the plurality of data points to a pillar of the plurality of pillars and processing the plurality of pillars to generate a pillar output. For convenience, the process 1500 will be described as being performed by a system of one or more computers located in one or more locations. For example, the vehicle 102 of FIG. 1, vehicle 200 of FIG. 2, device 300 of FIG. 3, or autonomous vehicle compute 400 of FIG. 4, appropriately programmed in accordance with this specification, can perform the process 1500.

Process 1500 begins when the system assigns each data point of the plurality of data points to a pillar in the plurality of pillars (step 1502). In some embodiments, the pillars are polar pillars. Generally, each data point of the plurality of data points is assigned to a respective pillar based on the 2D coordinates of the data point. That is, if the 2D coordinates of a data point are within a particular portion of the 2D ground plane from which a particular pillar extends, the data point is assigned to that particular pillar.

Process 1500 continues when the system determines whether a first count of a plurality of non-empty pillars (pillars that has at least one data point) exceeds a threshold value P (step 1504). If the first count of the plurality of non-empty pillars exceeds P, the system selects P non-empty pillars from the plurality of non-empty pillars (step 1506). For example, the system randomly subsamples P non-empty pillars from the plurality of non-empty pillars. If the first count of non-empty pillars is less than the first threshold value P, the system generates a second subset of pillars such that a sum of the first count and a second count of the second subset of pillars is equal to P (step 1508). The system then selects P non-empty pillars from the plurality of non-empty pillars and the second subset of pillars (step 1510).

For each non-empty pillar of the P non-empty pillars, the system is configured to maintain a threshold number of data points in each non-empty pillar. To do this, for each of the P non-empty pillars, the system performs the following set of operations (step 1512 and step 1514 or 216). The system first determines, for each of the P non-empty pillars, whether a third count of data points assigned to the non-empty pillar exceeds a second threshold value N (step 1512). If the third count of the data points assigned to the non-empty pillar exceeds the second threshold value N, the system selects N data points to be maintained in the non-empty pillars (step 1514). For example, the system randomly subsamples N data points from the data points assigned to the non-empty pillar. If the third count of the data points in the non-empty pillar is less than N, the system assigns the non-empty pillar a plurality of zero coordinate data points, such that the sum of a fourth count of the plurality of zero coordinates and the third count equals N (step 1516).

In some embodiments, the first threshold value P and the second threshold value N are predetermined values. In some embodiments, the first threshold value P and the second threshold value N are adaptive values. In particular, based on a density of the objects in the 3D space, the system can adjust P and/or N such that there are more pillars and/or more data points allowed in each pillar in a region of high object density, less pillars and/or less data points in each pillar in a region of low object density, and no pillars in a region of no objects.

Process 1500 continues when, for each non-empty pillar of the plurality of non-empty pillars, the system transforms each of the data points in the non-empty pillar into a respective modified data point (step 1518). The system generates a plurality of modified data points based upon the plurality of data points corresponding to each non-empty pillar. In particular, for each non-empty pillar, the system generates, for each data point in the non-empty pillar, a respective modified data point based on a relative distance between the data point and a center of the non-empty pillar. In an embodiment, the system generates, for each data point in the non-empty pillar, a respective modified data point based on the relative distance between the data point and the center of the non-empty pillar, and further based on a distance metric (e.g., a cylindrical Euclidean distance) from the sensor to the data point. The system then transforms the plurality of data points in each non-empty pillar to the plurality of modified data points generated for that non-empty pillar.

For example, in an embodiment, each data point of the plurality data points is represented by 3D spatial coordinates (x,y,z), a reflectance (r), and a time stamp (t). The system transforms each data point (x, y, z, r, t) to a respective modified data point ($x_{offset}$, $y_{offset}$, z, r, t, d), where $x_{offset}$ and $y_{offset}$ are measured based on a relative distance between each data point and the center of each non-empty point pillar, and d is the cylindrical Euclidean distance from the sensor to each data point. Each modified data point has D dimensions, where D is equal to the number of dimensions of the modified data point. In this example embodiment, each modified data point has D=6 dimensions: xoffset, yoffset, z, r, t, and d.

Process 1500 continues when the system generates a P dimensional pillar index vector (step 1520). The system first assigns a pillar index to each of the P non-empty pillars and a data point index to each of the modified data points in the P non-empty pillars. The system generates the P dimensional pillar index vector 1309 that maps the pillar index of each pillar to a corresponding location (e.g., a corresponding grid cell) in the original 2D grid from which the pillar vertically extends.

Process 1500 continues when the system generates a 3D stacked pillar tensor, which is a (D, P, N) dimensional tensor having a modified data point coordinate, a pillar index coordinate, and a data point index coordinate (step 1522). The 3D stacked pillar tensor maps, for each of the modified data points a pillar index of the pillar that includes the modified data point and a data point index of the modified data point to the modified data point ($x_{offset}$, $y_{offset}$, z, r, t, d). The system then generates a pillar output that includes the 3D stacked pillar tensor and the P dimensional pillar index vector (step 1524).

Figure 16:
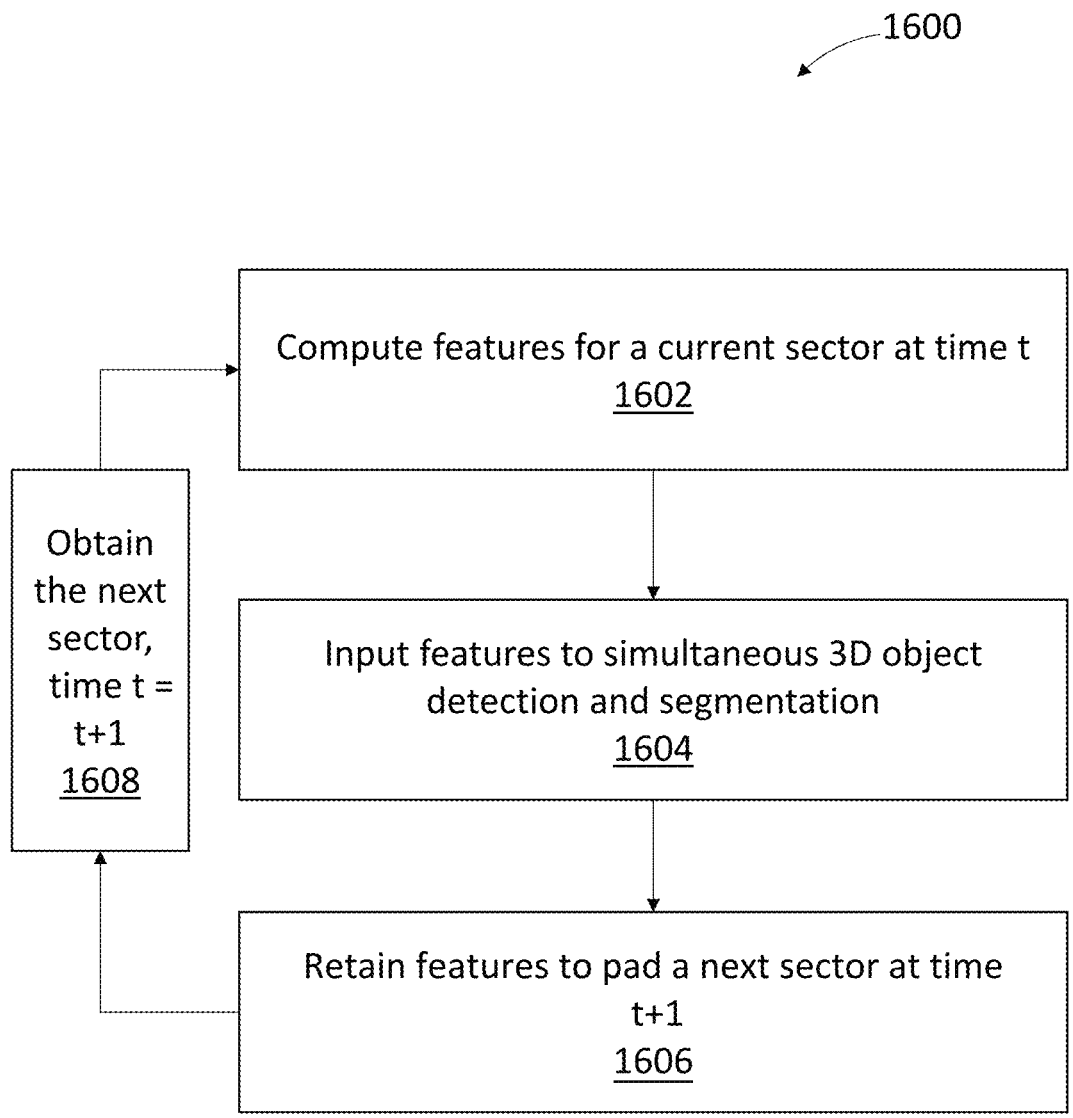
FIG. 16 is a flow chart of an example process for streaming object detection and segmentation with polar pillars.

FIG. 16 is a flow chart of an example process 1600 for streaming object detection and segmentation with polar pillars. For convenience, the process 1600 will be described as being performed by a system of one or more computers located in one or more locations. For example, the vehicle 102 of FIG. 1, vehicle 200 of FIG. 2, device 300 of FIG. 3, or autonomous vehicle compute 400 of FIG. 4, appropriately programmed in accordance with this specification, can perform the process 1600.

At block 1602, features are computed for a current sector at time t. In examples a LiDAR point cloud is converted into a bird's-eye view image or a range view image. Features are extracted from sectors of the BEV image. In examples, a BEV lacks of scale ambiguity, has a near lack of occlusion, and has an ease of fusing high definition maps and performing simultaneous detection and trajectory predictions. In some embodiments, to convert the point cloud into a BEV representation, the points can be grouped into voxels. In some embodiments, an exemplary architecture of a computing system for object detection using pillars (e.g., FIG. 7) discretizes the 3D space into pillars so there is only one voxel along the height dimension.

In some embodiments, the features are represented in a feature map (e.g., feature map 1006). Additionally, in some embodiments, the features computed for the current sector at time t are padded with features from time t−1. In examples, the padding trailing edge padding, bidirectional padding, or any combination thereof. The features are computed by capturing a wedge-shaped sector that includes a plurality of LiDAR data points.

At block 1604, the feature map computed from the current sector, including any padding, is used for simultaneous 3D object detection and segmentation at time t. In some embodiments, the stream of LiDAR point cloud data enables 3D panoptic segmentation. The present techniques as described herein outperforms the traditional techniques in the nuScenes 3D Panoptic Segmentation Benchmark with 55% less runtime.

At block 1606, some features computed at time t are retained to pad features computed for a next sector at time t+1. Each sector in a stream of sectors is used to compute features, and a portion of the features from a first sector pads a second sector in multi-scale padding. At block 1608, a next sector of sensor data is obtained at the next time stamp and time t=t+1. In this manner, the sectors are iteratively processed for simultaneous 3D object detection and segmentation at time t. The present techniques enable an efficient streaming based LiDAR perception models using a polar grid. Multi-scale context padding is an efficient approach to enhance the context of streaming LiDAR perception models.

In examples, the present techniques outperform traditional streaming methods in both panoptic quality and speed. In some embodiments, the present techniques include augmentation. Data augmentation is carried out for neural networks during training to improve performance and speed up training time. In examples, a class-balanced sampling of scenes is used as proposed in class-balanced grouping and sampling for point cloud 3D object detection. Before slicing the full-sweep point clouds into sectors, a random flip is conducted along x,y axis to a full sweep.

Figure 17:
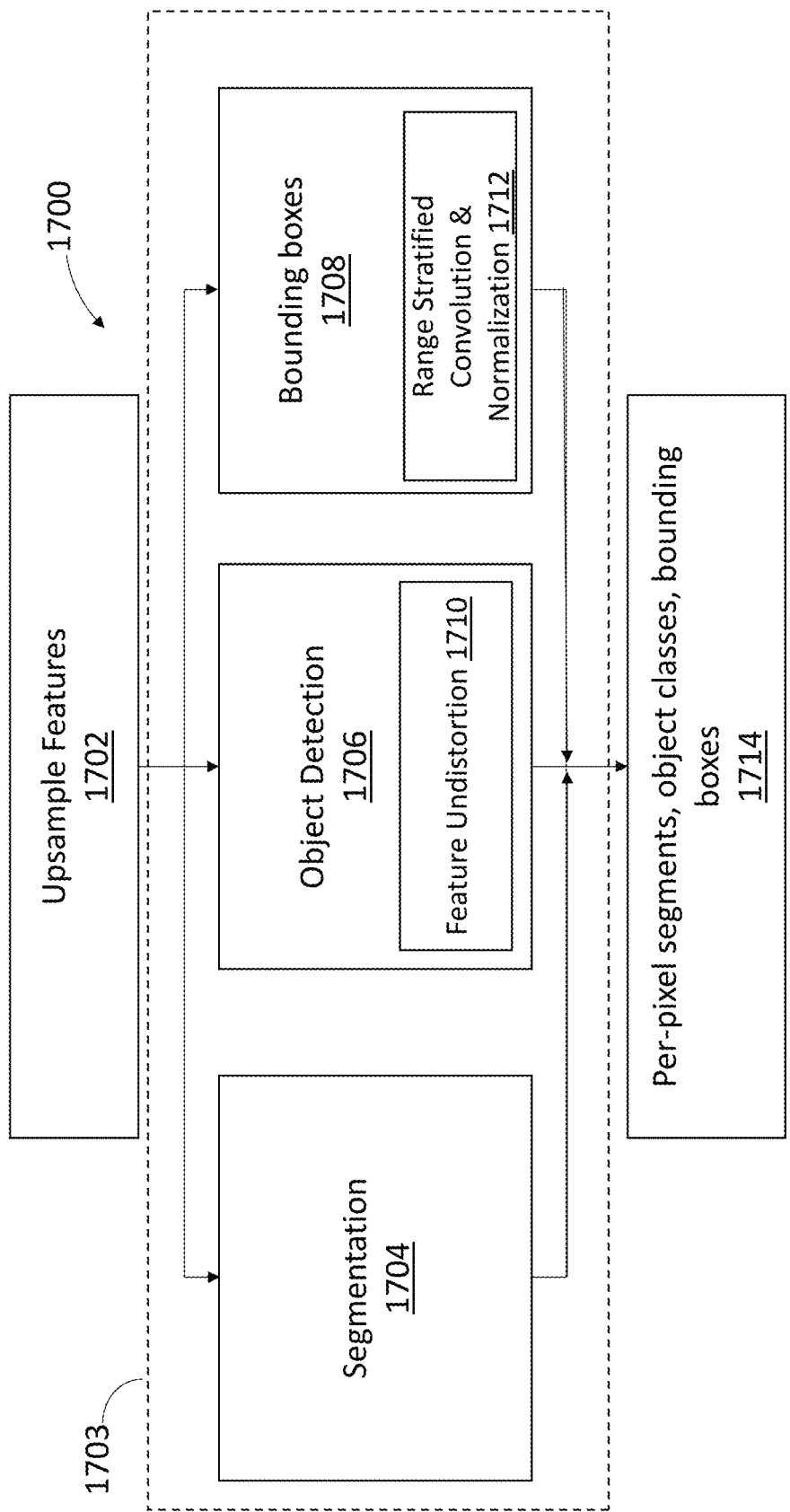
FIG. 17 is a flow chart of an example process for detecting objects in the environment using polar pillars.

FIG. 17 is a flow chart of an example process 1700 for detecting objects in the environment using polar pillars. For convenience, the process 1700 will be described as being performed by a system of one or more computers located in one or more locations. For example, the vehicle 102 of FIG. 1, vehicle 200 of FIG. 2, device 300 of FIG. 3, or autonomous vehicle compute 400 of FIG. 4, appropriately programmed in accordance with this specification, can perform the process 1700.

At block 1702, features are upsampled by a backbone that includes a 2D convolutional neural network. In embodiments, the features are extracted from polar pillars.

At block 1703, a segmentation 1704 (e.g., segmentation head), object detection 1706 (e.g., classification head), and bounding box generation 1708 (e.g., bounding box head) is simultaneously performed in parallel. The segmentation head 1704 takes as input concatenated outputs from a pillar feature encoder and bilinearly upsampled features from the 2D backbone. The object detection 1706 detects object classes and implements feature undistortion 1710 using the bilinearly upsampled features from the 2D backbone to interpolate features at Cartesian pillar locations using the original polar pillar locations so that the translation-invariant property of convolution applies. The connection of bilinear sampling to convolution is found and bilinear sampling is mimicked using convolution. The bounding boxes generation 1708 implements range stratified convolution and normalization layers 1712 of a neural network. In some embodiments, range stratified convolution and normalization layers 1712 of a neural network layers apply different convolution kernels and normalization based on a range corresponding to the changing pillar sizes in a polar grid.

At block 1714, the per-pixel segments, object detection, and bounding boxes are generated. In some embodiments, panoptic segmentation in achieved by combining the outputs of the semantic segmentation and object detection. In this manner, the present techniques enable improvements to the application of convolutions on a polar grid including feature undistortion, and range stratified convolution and normalization layers which add minimal latency to simultaneous 3D object detection and LiDAR segmentation.

According to some non-limiting embodiments or examples, provided is a system, comprising at least one processor and at least one non-transitory storage media storing instructions that, when executed by the at least one processor, cause the at least one processor to stream sensor data from a sensor of a vehicle, wherein the sensor data is divided into sectors and encoded into polar pillars, and wherein sectors comprise data points that represent objects in a three-dimensional (3D) space surrounding a vehicle. The instructions cause the at least one processor to compute features for a current sector, wherein the features are extracted from polar pillars corresponding to the current sector to a rectangular feature map. The instructions cause the at least one processor to perform simultaneous 3D object detection and segmentation using the rectangular feature map, wherein segmentation is performed in parallel with object classification and bounding box calculations. Additionally, the instructions cause the at least one processor to operate the vehicle based on the simultaneous 3D object detection and segmentation, wherein simultaneous 3D object detection and segmentation is iteratively performed on streams of sectors.

According to some non-limiting embodiments or examples, provided is a method, comprising streaming, with at least one processor, sensor data from a sensor of a vehicle, wherein the sensor data is divided into sectors and encoded into polar pillars, and wherein sectors comprise data points that represent objects in a three-dimensional (3D) space surrounding a vehicle. The method comprises computing features for a current sector, wherein the features are extracted from polar pillars corresponding to the current sector to a rectangular feature map. The method comprises performing simultaneous 3D object detection and segmentation using the rectangular feature map, wherein segmentation is performed in parallel with object classification and bounding box calculations. Additionally, the method comprises operating, with the at least one processor, the vehicle based on the simultaneous 3D object detection and segmentation, wherein simultaneous 3D object detection and segmentation is iteratively performed on streams of sectors.

According to some non-limiting embodiments or examples, provided is at least one non-transitory computer-readable medium comprising one or more instructions that, when executed by at least one processor, cause the at least one processor to stream sensor data from a sensor of a vehicle, wherein the sensor data is divided into sectors and encoded into polar pillars, and wherein sectors comprise data points that represent objects in a three-dimensional (3D) space surrounding a vehicle. The instructions cause the at least one processor to compute features for a current sector, wherein the features are extracted from polar pillars corresponding to the current sector to a rectangular feature map. The instructions cause the at least one processor to perform simultaneous 3D object detection and segmentation using the rectangular feature map, wherein segmentation is performed in parallel with object classification and bounding box calculations. Additionally, the instructions cause the at least one processor to operate the vehicle based on the simultaneous 3D object detection and segmentation, wherein simultaneous 3D object detection and segmentation is iteratively performed on streams of sectors.

Clause 1: A system, comprising: at least one processor, and at least one non-transitory storage media storing instructions that, when executed by the at least one processor, cause the at least one processor to: stream sensor data from a sensor of a vehicle, wherein the sensor data is divided into sectors and encoded into polar pillars, and wherein sectors comprise data points that represent objects in a three-dimensional (3D) space surrounding a vehicle; compute features for a current sector, wherein the features are extracted from polar pillars corresponding to the current sector to a rectangular feature map; perform simultaneous 3D object detection and segmentation using the rectangular feature map, wherein segmentation is performed in parallel with object classification and bounding box calculations; and operate the vehicle based on the simultaneous 3D object detection and segmentation, wherein simultaneous 3D object detection and segmentation is iteratively performed on streams of sectors.

Clause 2: The system of clause 1, wherein computing features for a current sector comprises trailing edge context padding, wherein the features from a preceding sector at time t−1 are used to pad the features computed for the current sector at time t.

Clause 3: The system of any of clauses 1 or 2, wherein computing features for a current sector comprises bidirectional context padding, wherein features from a preceding sector at time t−1 and aggregated features from a full sweep of a previous time frame are used to pad the features computed for the current sector.

Clause 4: The system of any of clauses 1-3, wherein performing simultaneous 3D object detection and segmentation using the rectangular feature map outputs an image of an environment, wherein pixel of the environment includes a Boolean value that indicates if an object is present or not present in the image.

Clause 5: The system of any of clauses 1-4, wherein performing simultaneous 3D object detection and segmentation using the rectangular feature map comprises outputting a bounding box and an object classification associated with each bounding box.

Clause 6: The system of any of clauses 1-5, wherein simultaneous 3D object detection and segmentation is performed by a neural network trained by simulating a streaming dataset.

Clause 7: The system of clause 6, wherein the streaming dataset is simulated by artificially slicing input data points into sectors according to their respective azimuth.

Clause 8: A method, comprising: streaming, with at least one processor, sensor data from a sensor of a vehicle, wherein the sensor data is divided into sectors and encoded into polar pillars, and wherein sectors comprise data points that represent objects in a three-dimensional (3D) space surrounding a vehicle; computing, with the at least one processor, features for a current sector, wherein the features are extracted from polar pillars corresponding to the current sector to a rectangular feature map; performing, with the at least one processor, simultaneous 3D object detection and segmentation using the rectangular feature map, wherein segmentation is performed in parallel with object classification and bounding box calculations; and operating, with the at least one processor, the vehicle based on the simultaneous 3D object detection and segmentation, wherein simultaneous 3D object detection and segmentation is iteratively performed on streams of sectors.

Clause 9: The method of clause 8, wherein computing features for a current sector comprises trailing edge context padding, wherein the features from a preceding sector at time t−1 are used to pad the features computed for the current sector at time t.

Clause 10: The method of clauses 8 or 9, wherein computing features for a current sector comprises bidirectional context padding, wherein features from a preceding sector at time t−1 and aggregated features from a full sweep of a previous time frame are used to pad the features computed for the current sector.

Clause 11: The method of any of clauses 8-10, wherein performing simultaneous 3D object detection and segmentation using the rectangular feature map outputs an image of an environment, wherein pixel of the environment includes a Boolean value that indicates if an object is present or not present in the image.

Clause 12: The method of any of clauses 8-11, wherein performing simultaneous 3D object detection and segmentation using the rectangular feature map comprises outputting a bounding box and an object classification associated with each bounding box.

Clause 13: The method of any of clauses 8-12, wherein simultaneous 3D object detection and segmentation is performed by a neural network trained by simulating a streaming dataset.

Clause 14: The method of clause 13, wherein the streaming dataset is simulated by artificially slicing input data points into sectors according to their respective azimuth.

Clause 15: At least one non-transitory storage media storing instructions that, when executed by at least one processor, cause the at least one processor to: stream sensor data from a sensor of a vehicle, wherein the sensor data is divided into sectors and encoded into polar pillars, and wherein sectors comprise data points that represent objects in a three-dimensional (3D) space surrounding a vehicle; compute features for a current sector, wherein the features are extracted from polar pillars corresponding to the current sector to a rectangular feature map; perform simultaneous 3D object detection and segmentation using the rectangular feature map, wherein segmentation is performed in parallel with object classification and bounding box calculations; and operate the vehicle based on the simultaneous 3D object detection and segmentation, wherein simultaneous 3D object detection and segmentation is iteratively performed on streams of sectors.

Clause 16: The at least one non-transitory storage media of clause 15, wherein computing features for a current sector comprises trailing edge context padding, wherein the features from a preceding sector at time t−1 are used to pad the features computed for the current sector at time t.

Clause 17: The at least one non-transitory storage media of clauses 15 or 16, wherein computing features for a current sector comprises bidirectional context padding, wherein features from a preceding sector at time t−1 and aggregated features from a full sweep of a previous time frame are used to pad the features computed for the current sector.

Clause 18: The at least one non-transitory storage media of any of clauses 15-17, wherein performing simultaneous 3D object detection and segmentation using the rectangular feature map outputs an image of an environment, wherein pixel of the environment includes a Boolean value that indicates if an object is present or not present in the image.

Clause 19: The at least one non-transitory storage media of any of clauses 15-18, wherein performing simultaneous 3D object detection and segmentation using the rectangular feature map comprises outputting a bounding box and an object classification associated with each bounding box.

Clause 20: The at least one non-transitory storage media of any of clauses 15-19, wherein simultaneous 3D object detection and segmentation is performed by a neural network trained by simulating a streaming dataset In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, the term "further comprising" is used in the foregoing description or following claims, what follows this phrase can be an additional step or entity, or a sub-step/sub-entity of a previously-recited step or entity.

What is claimed is:

1. A system, comprising:
   at least one processor, and
   at least one non-transitory storage media storing instructions that, when executed by the
   at least one processor, cause the at least one processor to:
   stream sensor data from a sensor of a vehicle, wherein the sensor data is divided into sectors and encoded into polar pillars, and wherein sectors comprise data points that represent objects in a three-dimensional (3D) space surrounding the vehicle;
   compute features for a current sector, wherein the features are extracted from polar pillars corresponding to the current sector to a rectangular feature map;
   perform simultaneous 3D object detection and segmentation iteratively on streams of sectors using the rectangular feature map, wherein segmentation is performed in parallel with object classification and bounding box calculations; and
   operate the vehicle based on the simultaneous 3D object detection and segmentation.

2. The system of claim 1, wherein computing features for a current sector comprises trailing edge context padding, wherein the features from a preceding sector at time t−1 are used to pad the features computed for the current sector at time t.

3. The system of claim 1, wherein computing features for a current sector comprises bidirectional context padding, wherein features from a preceding sector at time t−1 and aggregated features from a full sweep of a previous time frame are used to pad the features computed for the current sector.

4. The system of claim 1, wherein performing simultaneous 3D object detection and segmentation using the rectangular feature map outputs an image of an environment, wherein pixel of the environment includes a Boolean value that indicates if an object is present or not present in the image.

5. The system of claim 1, wherein performing simultaneous 3D object detection and segmentation using the rectangular feature map comprises outputting a bounding box and an object classification associated with each bounding box.

6. The system of claim 1, wherein simultaneous 3D object detection and segmentation is performed by a neural network trained by simulating a streaming dataset.

7. The system of claim 6, wherein the streaming dataset is simulated by artificially slicing input data points into sectors according to their respective azimuth.

8. A method, comprising:
   streaming, with at least one processor, sensor data from a sensor of a vehicle, wherein the sensor data is divided into sectors and encoded into polar pillars, and wherein sectors comprise data points that represent objects in a three-dimensional (3D) space surrounding the vehicle;
   computing, with the at least one processor, features for a current sector, wherein the features are extracted from polar pillars corresponding to the current sector to a rectangular feature map;
   performing, with the at least one processor, simultaneous 3D object detection and segmentation iteratively on streams of sectors using the rectangular feature map, wherein segmentation is performed in parallel with object classification and bounding box calculations; and
   operating, with the at least one processor, the vehicle based on the simultaneous 3D object detection and segmentation.

9. The method of claim 8, wherein computing features for a current sector comprises trailing edge context padding, wherein the features from a preceding sector at time t−1 are used to pad the features computed for the current sector at time t.

10. The method of claim 8, wherein computing features for a current sector comprises bidirectional context padding, wherein features from a preceding sector at time t−1 and aggregated features from a full sweep of a previous time frame are used to pad the features computed for the current sector.

11. The method of claim 8, wherein performing simultaneous 3D object detection and segmentation using the rectangular feature map outputs an image of an environment, wherein pixel of the environment includes a Boolean value that indicates if an object is present or not present in the image.

12. The method of claim 8, wherein performing simultaneous 3D object detection and segmentation using the rectangular feature map comprises outputting a bounding box and an object classification associated with each bounding box.

13. The method of claim 8, wherein simultaneous 3D object detection and segmentation is performed by a neural network trained by simulating a streaming dataset.

14. The method of claim 13, wherein the streaming dataset is simulated by artificially slicing input data points into sectors according to their respective azimuth.

15. At least one non-transitory storage media storing instructions that, when executed by at least one processor, cause the at least one processor to:
   stream sensor data from a sensor of a vehicle, wherein the sensor data is divided into sectors and encoded into polar pillars, and wherein sectors comprise data points that represent objects in a three-dimensional (3D) space surrounding the vehicle;
   compute features for a current sector, wherein the features are extracted from polar pillars corresponding to the current sector to a rectangular feature map;
   perform simultaneous 3D object detection and segmentation iteratively on streams of sectors using the rectangular feature map, wherein segmentation is performed in parallel with object classification and bounding box calculations; and
   operate the vehicle based on the simultaneous 3D object detection and segmentation, wherein simultaneous 3D object detection and segmentation is iteratively performed on streams of sectors.

16. The at least one non-transitory storage media of claim 15, wherein computing features for a current sector comprises trailing edge context padding, wherein the features from a preceding sector at time t−1 are used to pad the features computed for the current sector at time t.

17. The at least one non-transitory storage media of claim 15, wherein computing features for a current sector comprises bidirectional context padding, wherein features from a preceding sector at time t−1 and aggregated features from a full sweep of a previous time frame are used to pad the features computed for the current sector.

18. The at least one non-transitory storage media of any claim 15, wherein performing simultaneous 3D object detection and segmentation using the rectangular feature map outputs an image of an environment, wherein pixel of the environment includes a Boolean value that indicates if an object is present or not present in the image.

19. The at least one non-transitory storage media any of claim 15, wherein performing simultaneous 3D object detection and segmentation using the rectangular feature map comprises outputting a bounding box and an object classification associated with each bounding box.

20. The at least one non-transitory storage media any of claim 15, wherein simultaneous 3D object detection and segmentation is performed by a neural network trained by simulating a streaming dataset.

\* \* \* \* \*